(12) United States Patent
Jiang et al.

(10) Patent No.: US 12,737,641 B2
(45) Date of Patent: Sep. 15, 2026

(54) METHOD AND DEVICE FOR RECOMMENDING GOODS, METHOD AND DEVICE FOR TRAINING GOODS KNOWLEDGE GRAPH, AND METHOD AND DEVICE FOR TRAINING MODEL

(71) Applicants: Beijing BOE Technology Development Co., Ltd., Beijing (CN); BOE Technology Group Co., Ltd., Beijing (CN)

(72) Inventors: Boran Jiang, Beijing (CN); Ge Ou, Beijing (CN); Chao Ji, Beijing (CN); Chuqian Zhong, Beijing (CN); Shuqi Wei, Beijing (CN); Pengfei Zhang, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 752 days.

(21) Appl. No.: 18/026,327

(22) PCT Filed: Mar. 30, 2022

(86) PCT No.: PCT/CN2022/084036

§ 371 (c)(1),
(2) Date: Mar. 14, 2023

(87) PCT Pub. No.: WO2023/184226

PCT Pub. Date: Oct. 5, 2023

(65) Prior Publication Data

US 2024/0303507 A1 Sep. 12, 2024

(51) Int. Cl.
*G06N 5/02* (2023.01)
*G06Q 30/0601* (2023.01)

(52) U.S. Cl.
CPC .......... *G06N 5/02* (2013.01); *G06Q 30/0631* (2013.01)

(58) Field of Classification Search
CPC ............................ G06N 5/02; G06Q 30/0631
See application file for complete search history.

(56) References Cited

U.S. PATENT DOCUMENTS 11,526,508 B1 * 12/2022 McCallie, Jr. .......... G06F 40/30
2019/0392330 A1 * 12/2019 Martineau ................ G06N 5/04
(Continued)

FOREIGN PATENT DOCUMENTS

CN 111259133 A 6/2020
CN 112487200 A 3/2021
(Continued)

*Primary Examiner* — Marc S Somers
(74) *Attorney, Agent, or Firm* — IPro, PLLC

(57) ABSTRACT

Provided are a method and device for recommending goods, a method and device for training a goods knowledge graph, and a method and device for training a model. The method for training a goods knowledge graph includes: constructing an initial goods knowledge graph based on a first type of triples and a second type of triples, where a format of the first type of triples is head entity-relation-tail entity, and a format of the second type of triples is entity-attribute-attribute value (S101); and training the initial goods knowledge graph based on a graph embedding model to obtain embedding vectors of entities in the trained goods knowledge graph (S102).

11 Claims, 10 Drawing Sheets

Obtain a search request from a user — S701

Obtain a preference probability of the user for goods according to a graph convolution network model trained based on historical goods search information of the user, where the graph convolution network model is constructed based on a trained goods knowledge graph, and the trained goods knowledge graph is obtained by training an initial goods knowledge graph by using the training method according to any one of the above items — S702

Output a goods recommendation list according to the preference probability — S703

(56) References Cited

U.S. PATENT DOCUMENTS

| | | | | |
|---|---|---|---|---|
| 2020/0104395 | A1* | 4/2020 | Bhatia | G06F 16/26 |
| 2021/0149993 | A1* | 5/2021 | Torres | G06V 10/40 |
| 2021/0365818 | A1* | 11/2021 | Liu | G06Q 30/0631 |
| 2022/0179910 | A1* | 6/2022 | Bharathy | G06F 16/9024 |
| 2023/0041927 | A1* | 2/2023 | Chen | G06N 3/042 |
| 2023/0135683 | A1* | 5/2023 | Balasubramanian | G06Q 30/0625 705/26.7 |
| 2023/0153579 | A1* | 5/2023 | Sun | G06N 3/0464 706/25 |

FOREIGN PATENT DOCUMENTS

| | | | |
|---|---|---|---|
| CN | 112749339 | A | 5/2021 |
| CN | 112800326 | A | 5/2021 |
| CN | 113590900 | A | 11/2021 |
| CN | 113836312 | A | 12/2021 |
| WO | 2021139247 | A1 | 7/2021 |

* cited by examiner

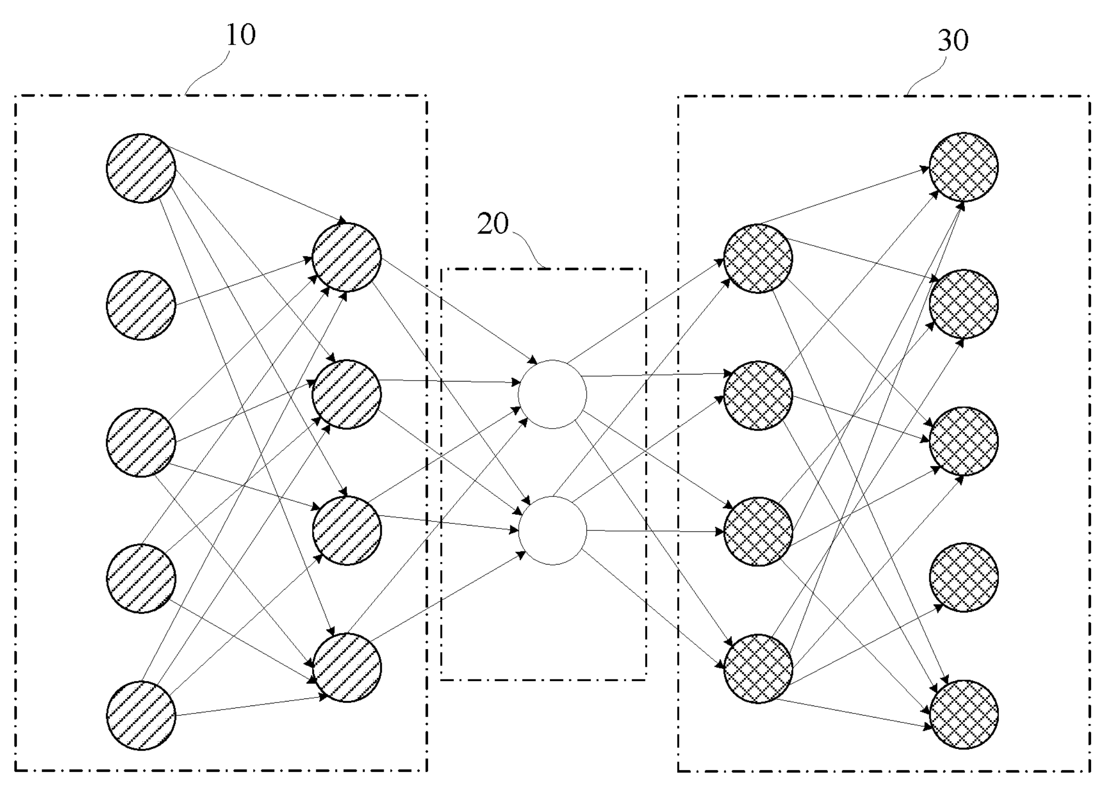

Fig. 9

Obtain a search request from a user — S701

Obtain a preference probability of the user for goods according to a graph convolution network model trained based on historical goods search information of the user, where the graph convolution network model is constructed based on a trained goods knowledge graph, and the trained goods knowledge graph is obtained by training an initial goods knowledge graph by using the training method according to any one of the above items — S702

Output a goods recommendation list according to the preference probability — S703

Fig. 10

Figure 15:
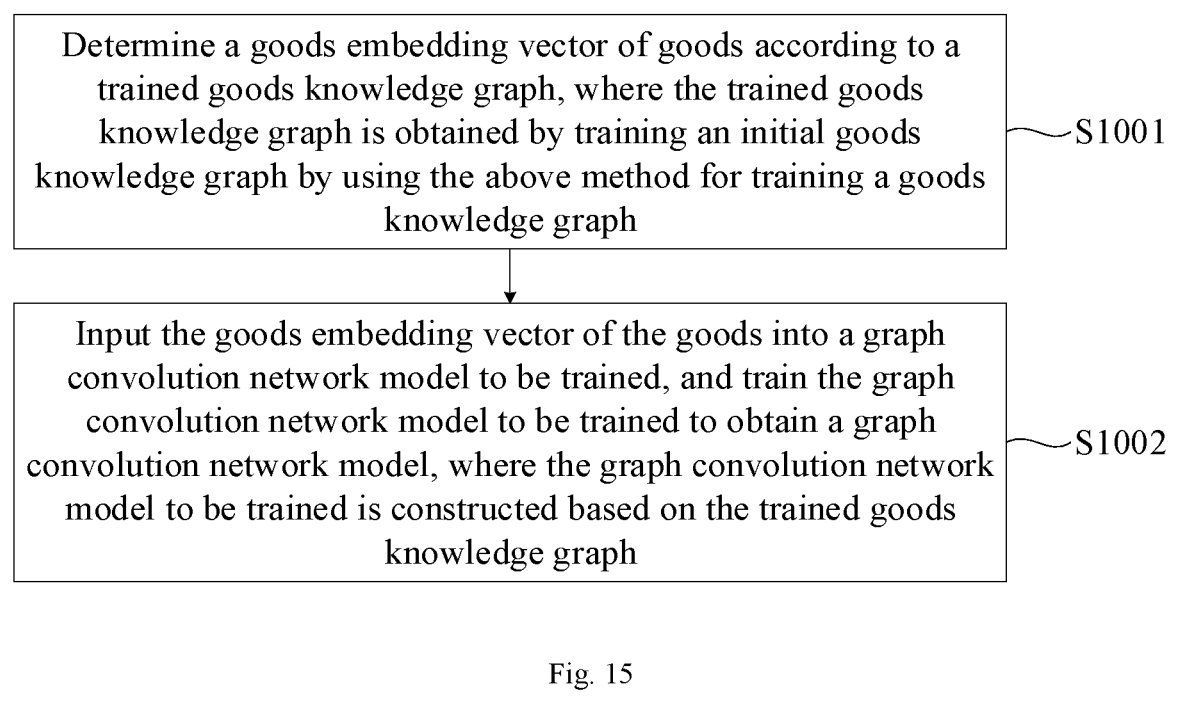

Determine a goods embedding vector of goods according to a trained goods knowledge graph, where the trained goods knowledge graph is obtained by training an initial goods knowledge graph by using the above method for training a goods knowledge graph

S1001

Input the goods embedding vector of the goods into a graph convolution network model to be trained, and train the graph convolution network model to be trained to obtain a graph convolution network model, where the graph convolution network model to be trained is constructed based on the trained goods knowledge graph

METHOD AND DEVICE FOR RECOMMENDING GOODS, METHOD AND DEVICE FOR TRAINING GOODS KNOWLEDGE GRAPH, AND METHOD AND DEVICE FOR TRAINING MODEL

The present application is a National Stage of International Application No. PCT/CN2022/084036, filed on Mar. 30, 2022, which is hereby incorporated by reference in its entirety.

FIELD

The present disclosure relates to the technical field of computers, and particularly relates to a method and device for recommending goods, a method and device for training a goods knowledge graph, and a method and device for training a model.

BACKGROUND

How to make targeted recommendations according to interests of users has become an urgent technical problem to be solved.

SUMMARY

The present disclosure provides a method and device for recommending goods, a method and device for training a goods knowledge graph, and a method and device for training a model to improve the accuracy of goods recommendation.

In a first aspect, an embodiment of the present disclosure provides a method for training a goods knowledge graph. The method includes: constructing an initial goods knowledge graph based on a first type of triples and a second type of triples, where a format of the first type of triples is head entity-relation-tail entity, and a format of the second type of triples is entity-attribute-attribute value; and training the initial goods knowledge graph based on a graph embedding model to obtain embedding vectors of entities in the trained goods knowledge graph.

In a possible implementation mode, the training the initial goods knowledge graph based on the graph embedding model to obtain embedding vectors of entities in the trained goods knowledge graph includes: performing initialization encoding on head entities, relations and tail entities to obtain embedding vectors of the first type of triples; and inputting the embedding vectors of the first type of triples into the graph embedding model, and training the initial goods knowledge graph to obtain the embedding vectors of the entities in the trained goods knowledge graph.

In a possible implementation mode, the training the initial goods knowledge graph based on the graph embedding model to obtain embedding vectors of entities in the trained goods knowledge graph includes: performing embedding representation on the second type of triples to obtain embedding vectors of the second type of triples; and inputting the embedding vectors of the second type of triples into the graph embedding model, and training the initial goods knowledge graph to obtain the embedding vectors of the entities in the trained goods knowledge graph.

In a possible implementation mode, the training the initial goods knowledge graph based on the graph embedding model to obtain embedding vectors of entities in the trained goods knowledge graph includes: performing initialization encoding on the head entities, the relations and the tail entities to obtain the embedding vectors of the first type of triples; performing embedding representation on the second type of triples to obtain embedding vectors of the second type of triples; and inputting the embedding vectors of the first type of triples and the embedding vectors of the second type of triples into the graph embedding model alternately, and training the initial goods knowledge graph to obtain the embedding vectors of the entities in the trained goods knowledge graph.

In a possible implementation mode, the performing embedding representation on the second type of triples to obtain embedding vectors of the second type of triples includes: randomly initializing an n-dimensional unit vector with a modulus of 1, where n is a positive integer; multiplying a first attribute value of a digital type in attribute values of the second type of triples by the unit vector to obtain an embedding vector of the first attribute value; performing initialization encoding on entities and attributes in the second type of triples to obtain embedding vectors of the entities and the attributes; and obtaining embedding vectors of the second type of triples based on the embedding vector of the first attribute value and the embedding vectors of the entities and the attributes.

In a possible implementation mode, the performing embedding representation on the second type of triples to obtain embedding vectors of the second type of triples includes: performing initialization encoding on a second attribute value of a text type in attribute values of the second type of triples based on a self-attention model to obtain an initialization-encoded result; performing dimension reduction on the initialization-encoded result to obtain a dimension-reduced result, and taking the dimension-reduced result as an embedding vector of the second attribute value; performing initialization encoding on entities and attributes in the second type of triples to obtain embedding vectors of the entities and the attributes; and obtaining embedding vectors of the second type of triples based on the embedding vector of the second attribute value and the embedding vectors of the entities and the attributes.

In a possible implementation mode, the performing dimension reduction on the initialization-encoded result to obtain the dimension-reduced result includes: performing dimension reduction on the initialization-encoded result by means of an intermediate layer network structure of an autoencoder to obtain the dimension-reduced result.

In a second aspect, an embodiment of the present disclosure provides a method for recommending goods. The method includes: obtaining a search request from a user; obtaining a preference probability of the user for goods according to a graph convolution network model trained based on historical goods search information of the user, where the graph convolution network model is constructed based on a trained goods knowledge graph, and the trained goods knowledge graph is obtained by training an initial goods knowledge graph through the training method according to any one of the above modes; and outputting a goods recommendation list according to the preference probability.

In a possible implementation mode, the obtaining the preference probability of the user for goods according to the graph convolution network model trained based on historical goods search information of the user includes: determining a similarity between the goods and a head entity of an adjacent triple in a relation space, where the adjacent triple includes at least one triple; weighting and summing all tail entities of the adjacent triple with the similarity as a weight to obtain a first-order embedding vector of the user; taking the above operation as one propagation, and obtaining a final embedding vector of the user after H propagations of the graph convolution network model trained based on the historical goods search information of the user, where H is a positive integer; and multiplying the final embedding vector of the user by a goods embedding vector of the goods to obtain the preference probability of the user for the goods, where the goods embedding vector of the goods is obtained based on the trained goods knowledge graph.

In a possible implementation mode, the first-order embedding vector of the user is obtained based on a relation capture network to make the first-order embedding vector of the user learn edge relation information between the goods and the head entity of the adjacent triple; and a computational formula of the relation capture network is as follows:

$$c_i = o_c^i + o_c^i \cdot r';$$

where i is a positive integer greater than 0 and less than or equal to H, $$o_c^i$$

represents a weighted summation of all tail entities of the adjacent triple with the similarity as a weight for the $i^{th}$ propagation, and r' represents a relation vector.

In a possible implementation mode, before the obtaining the preference probability of the user for goods according to the graph convolution network model trained based on the historical goods search information of the user, the method further includes: determining a goods embedding vector of the goods according to the trained goods knowledge graph; and inputting the goods embedding vector of the goods into a graph convolution network model to be trained to obtain the graph convolution network model.

In a third aspect, an embodiment of the present disclosure further provides a method for training a model. The method includes: determining a goods embedding vector of goods according to a trained goods knowledge graph, where the trained goods knowledge graph is obtained by training an initial goods knowledge graph through the training method according to any one of the above modes; and inputting the goods embedding vector of the goods into a graph convolution network model to be trained, and training the graph convolution network model to be trained to obtain a graph convolution network model, where the graph convolution network model to be trained is constructed based on the trained goods knowledge graph.

In a possible implementation mode, the inputting the goods embedding vector of the goods into the graph convolution network model to be trained, and the training the graph convolution network model to be trained to obtain a graph convolution network model includes: determining a similarity between the goods embedding vector of the goods and a head entity of an adjacent triple in a relation space, where the adjacent triple includes at least one triple; weighting and summing all tail entities of the adjacent triple to obtain a first-order embedding vector of a user; taking the above operation as one propagation, and obtaining a final embedding vector of the user after H propagations of the graph convolution network model to be trained, where H is a positive integer; multiplying the final embedding vector of the user by the goods embedding vector of the goods to obtain a prediction probability of the user for the goods; computing a loss value according to the prediction probability and an actual probability of the user for the goods; and updating parameters of the graph convolution network model to be trained by using the loss value to obtain the graph convolution network model.

In a possible implementation mode, under a condition that the graph convolution network model to be trained is a model for making recommendations based on a binary classification task, the loss value is computed by using a following formula:

$$\ell = \sum_{i=1}^{n} -\left(y_i \log \sigma\left(C^T p\right) + (1 - y_i) \log\left(1 - \sigma\left(C^T p\right)\right)\right) + \lambda\left(\|p\|_2^2 + \|E\|_2^2 + \|R\|_2^2\right);$$

where $y_i$ represents the actual probability, $\sigma(C^T p)$ represents the prediction probability, and p represents the goods embedding vector of the goods.

In a possible implementation mode, under the condition that the graph convolution network model to be trained is a model for making recommendations based on a fitting task, the loss value is computed by using a following formula:

$$\ell = \frac{1}{n}\sum_{i=1}^{n} (y_i - \hat{y}_i)^2 + \lambda\left(\|p\|_2^2 + \|E\|_2^2 + \|R\|_2^2\right);$$

where $y_i$ represents the actual probability, $\hat{y}_i$ represents the prediction probability, and p represents the goods embedding vector of the goods.

In a fourth aspect, an embodiment of the present disclosure further provides a device for training a goods knowledge graph. The device includes: a first memory and a first processor; where the first memory is configured for storing a computer program; and the first processor is configured for executing the computer program in the first memory to implement the following steps: constructing an initial goods knowledge graph based on a first type of triples and a second type of triples, where a format of the first type of triples is head entity-relation-tail entity, and a format of the second type of triples is entity-attribute-attribute value; and training the initial goods knowledge graph based on a graph embedding model to obtain embedding vectors of entities in the trained goods knowledge graph.

In a fifth aspect, an embodiment of the present disclosure further provides a device for recommending goods. The device includes: a second memory and a second processor; where the second memory is configured for storing a computer program; and the second processor is configured for executing the computer program in the second memory to implement the following steps: obtaining goods search request information input by a user; obtaining a preference probability of the user for goods according to a graph convolution network model trained based on historical goods search information of the user, where the graph convolution network model is constructed based on a trained goods knowledge graph, and the trained goods knowledge graph is obtained by training an initial goods knowledge graph through the training method according to any one of the above modes; and outputting a goods recommendation list according to the preference probability.

In a sixth aspect, an embodiment of the present disclosure further provides a device for training a model. The device includes: a third memory and a third processor; where the third memory is configured for storing a computer program; and the third processor is configured for executing the computer program in the third memory to implement the following steps: determining a goods embedding vector of goods according to a trained goods knowledge graph, where the trained goods knowledge graph is obtained by training an initial goods knowledge graph through the training method according to any one of the above modes; and inputting the goods embedding vector of the goods into a graph convolution network model to be trained, and training the graph convolution network model to be trained to obtain a graph convolution network model, where the graph convolution network model to be trained is constructed based on the trained goods knowledge graph.

In a seventh aspect, an embodiment of the present disclosure further provides a computer-readable storage medium, storing a computer instruction, where when the computer instruction runs on a computer, the computer is made to execute the method for training a goods knowledge graph according to any one of the above modes, the method for recommending goods according to any one of the above modes, or the method for training a model according to any one of the above modes.

BRIEF DESCRIPTION OF THE DRAWINGS

FIG. 9 is one of schematic structural diagrams of an autoencoder in a method for training a goods knowledge graph according to an embodiment of the present disclosure.

FIG. 10 is a method flowchart of a method for recommending goods according to an embodiment of the present disclosure.

FIG. 15 is a method flowchart of a method for training a model according to the present disclosure.

DETAILED DESCRIPTION OF THE EMBODIMENTS

In order to make the objectives, technical solutions, and advantages in the embodiments of the present disclosure clearer, the technical solutions in the embodiments of the present disclosure will be clearly and completely described below with reference to the accompanying drawings in the embodiments of the present disclosure. It is obvious that the described embodiments are some embodiments rather than all embodiments of the present disclosure. Moreover, the embodiments of the present disclosure and features in the embodiments can be combined with one another without conflict. Based on the described embodiments of the present disclosure, all other embodiments acquired by those skilled in the art without making creative efforts fall within the scope of protection of the present disclosure.

Unless otherwise defined, technical or scientific terms used in the present disclosure should have ordinary meaning as understood by those of ordinary skill in the art to which the present disclosure belongs. As used in the present disclosure, words such as "comprise", "include" or "encompass" mean that elements or items appearing before the word encompass elements or items listed after the word and their equivalents, but do not exclude other elements or items.

In the related art, a correlation between goods and an entity node in a knowledge graph is often considered, resulting in that accuracy of goods recommendation is not high.

In view of this, embodiments of the present disclosure provide a method and device for recommending goods, a method and device for training a goods knowledge graph, and a method and device for training model to improve the accuracy of goods recommendation.

Figure 1:
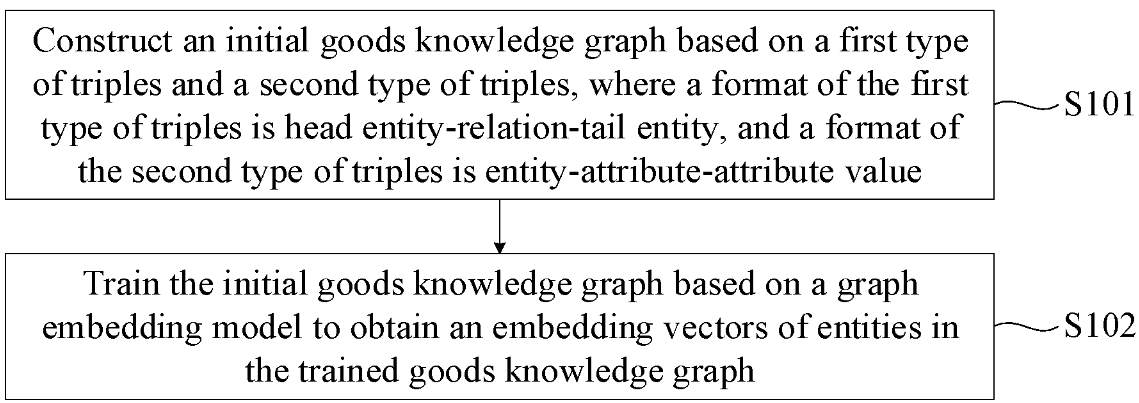
FIG. 1 is a method flowchart of a method for training a goods knowledge graph according to an embodiment of the present disclosure.

As shown in FIG. 1, an embodiment of the present disclosure provides a method for training a goods knowledge graph. The method includes: S101: constructing an initial goods knowledge graph based on a first type of triples and a second type of triples, where a format of the first type of triples is head entity-relation-tail entity, and a format of the second type of triples is entity-attribute-attribute value; and S102: training the initial goods knowledge graph based on a graph embedding model to obtain embedding vectors of entities in the trained goods knowledge graph.

In a particular implementation process, a particular implementation process of S101 to S102 is as follows.

First, the initial goods knowledge graph is constructed based on the first type of triples and the second type of triples. The format of the first type of triples is head entity-relation-tail entity, and the first type of triples may be represented as (h, r, t), where h represents head entities in the first type of triples, r represents the relations in the first type of triples, and t represents the tail entities in the first type of triples. The format of the second type of triples is entity-attribute-attribute value, the attribute is used for characterizing an inherent property of an entity, and different goods may have different corresponding attributes, for example, as for a mobile phone, the corresponding attributes include image resolution, a screen size, etc. For another example, as for a patent document, its corresponding attributes include the number of claims, a legal status, etc.

Figure 2:
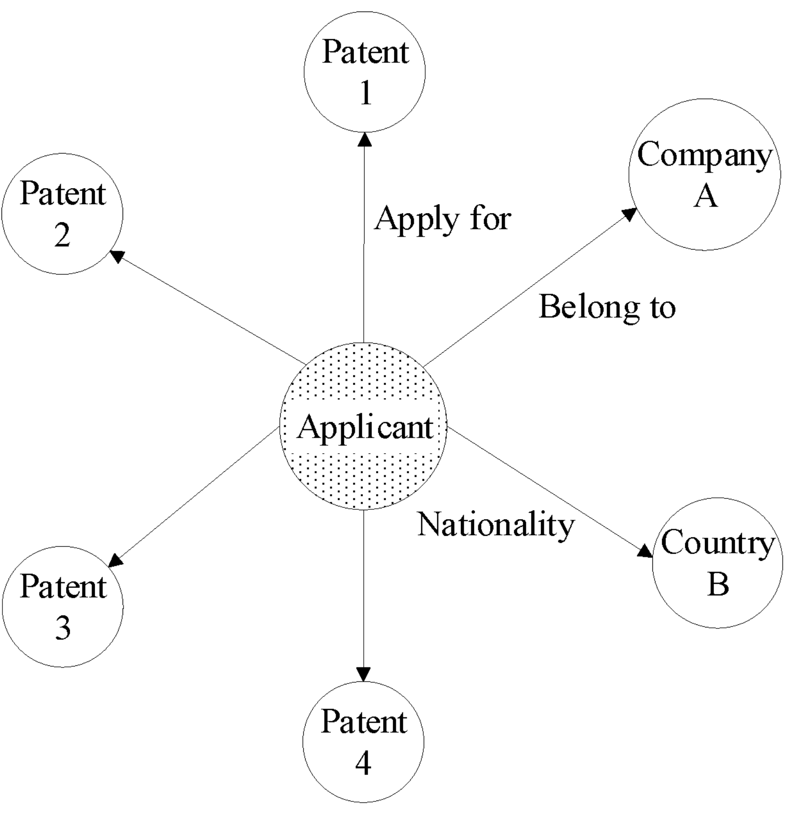
FIG. 2 is a schematic diagram of a partial structure of an initial goods knowledge graph in a method for training a goods knowledge graph according to an embodiment of the present disclosure.

FIG. 2 is a schematic diagram of a partial structure of an initial goods knowledge graph. As for a triple (Applicant, Apply for, Patent 1), "Applicant" represents the head entity, "Apply for" represents the relation, and "Patent 1" represents the tail entity. The second type of triples may be represented as (e, a, p), where e represents entities in the second type of triples, a represents attributes in the second type of triples, and p represents an attribute value in the second type of triples. Still with reference to FIG. 2, in a triple (Applicant, Belong to, Company A), "Applicant" represents the entity, "Belong to" represents the attribute, and "Company A" represents the attribute value. For another example, in a triple (Applicant, Nationality, Country B), "Applicant" represents the entity, "Nationality" represents the attribute, and "Country B" represents the attribute value. Certainly, entities and attributes may be defined according to prior experience in a required technical field to construct a first type of triples and a second type of triples in corresponding formats, so as to construct an initial goods knowledge graph according to the first type of triples and the second type of triples.

Then, the initial goods knowledge graph is trained based on the graph embedding model to obtain the embedding vectors of the entities in the trained goods knowledge graph. The graph embedding model may be a TransH model, a TransR model, or a TransE model, which is not limited herein. In this way, each node in the trained goods knowledge graph not only fuses relations between its own entity and other entities, but also fuses relations between entities and their own attributes. Thus, the accuracy of goods recommendation may be improved by subsequently applying the trained goods knowledge graph to a system for recommending goods. It should be noted that in the embodiments of the present disclosure, the goods knowledge graph to be trained may be an intangible-goods knowledge graph or a tangible-goods knowledge graph. For example, intangible goods are audio and video documents, patents, trademarks, paper, or news, etc., and tangible goods are clothing, food, vehicles, or electronic products, etc. Certainly, an initial goods knowledge graph in a required technical field may further be constructed and trained according to practical application requirements, which is not limited herein.

Figure 3:
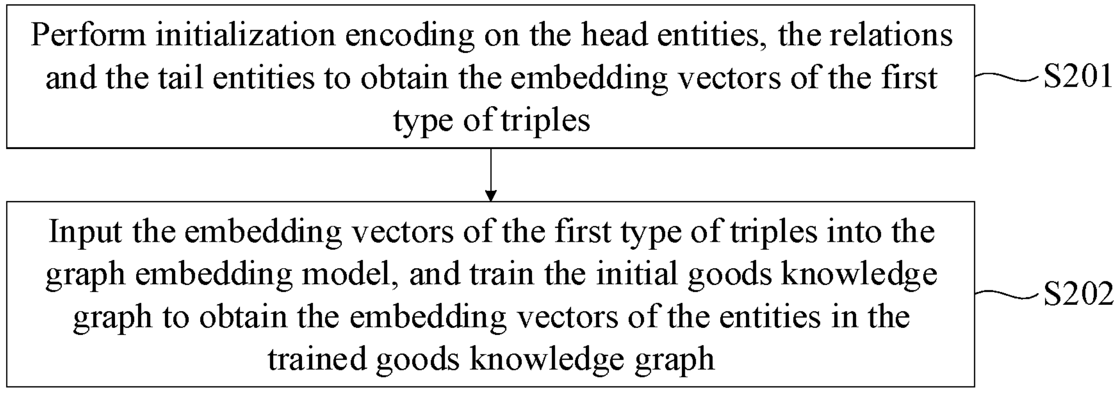
FIG. 3 is a method flowchart of a first implementation mode of step S102 in FIG. 1.

In the embodiments of the present disclosure, there may be several implementation modes to train the initial goods knowledge graph to obtain the embedding vectors of the entities in the trained goods knowledge graph. The first implementation mode is as shown in FIG. 3, and correspondingly, the step S102: training the initial goods knowledge graph based on a graph embedding model to obtain embedding vectors of entities in the trained goods knowledge graph includes the following.

S201: performing initialization encoding on the head entities, the relations and the tail entities to obtain the embedding vectors of the first type of triples; and S202: inputting the embedding vectors of the first type of triples into the graph embedding model, and train the initial goods knowledge graph to obtain the embedding vectors of the entities in the trained goods knowledge graph.

In a particular implementation process, a particular implementation process of S201 to S202 is as follows.

Firstly, initialization encoding is performed on the head entities, the relations and the tail entities in the first type of triples, so as to determine initial vectors of the head entities, the relations and the tail entities in the first type of triples, and then the embedding vectors of the first type of triples are obtained according to the initial vectors of the head entities, the relations and the tail entities in the first type of triples. Then the embedding vectors of the first type of triples are input into the graph embedding model, the initial goods knowledge graph is trained to obtain the trained goods knowledge graph, so as to obtain the embedding vectors of the entities in the trained goods knowledge graph according to the trained goods knowledge graph. In this way, the trained goods knowledge graph may be used in the subsequent graph convolution network model for recommending goods, which guarantees the accuracy of goods recommendation. It should be noted that the reference to "graph embedding model" in the present disclosure is a trained model unless specifically stated.

Figure 4:
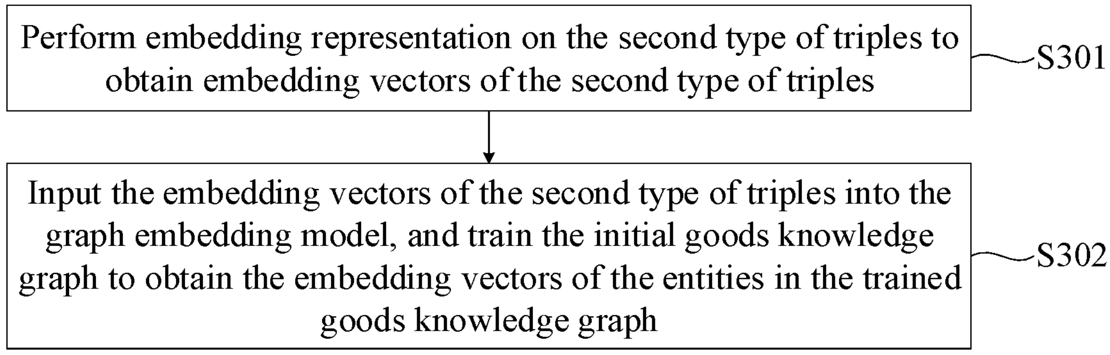
FIG. 4 is a method flowchart of a second implementation mode of step S102 in FIG. 1.

The second implementation mode is as shown in FIG. 4, and correspondingly, the step S102: training the initial goods knowledge graph based on a graph embedding model to obtain embedding vectors of entities in the trained goods knowledge graph includes the following.

S301: performing embedding representation on the second type of triples to obtain the embedding vectors of the second type of triples; and S302: inputting the embedding vectors of the second type of triples into the graph embedding model, and train the initial goods knowledge graph to obtain the embedding vectors of the entities in the trained goods knowledge graph.

In a specific implementation process, a specific implementation process of S301 to S302 is as follows.

Firstly, embedding representation is performed on the second type of triples to obtain the embedding vectors of the second type of triples. Then, the embedding vectors of the second type of triples are input into the graph embedding model, the initial goods knowledge graph is trained to obtain the trained goods knowledge graph, so as to obtain the embedding vectors of the entities in the trained goods knowledge graph according to the trained goods knowledge graph. In this way, the trained goods knowledge graph may be used in the subsequent graph convolution network model for recommending goods, which guarantees the accuracy of goods recommendation. A particular implementation process of the embedding representation of the second type of triples may be described with reference to the relevant sections below. It should be noted that the embedding representation of the second type of triples is essentially a process of converting words into vectors.

Figure 5:
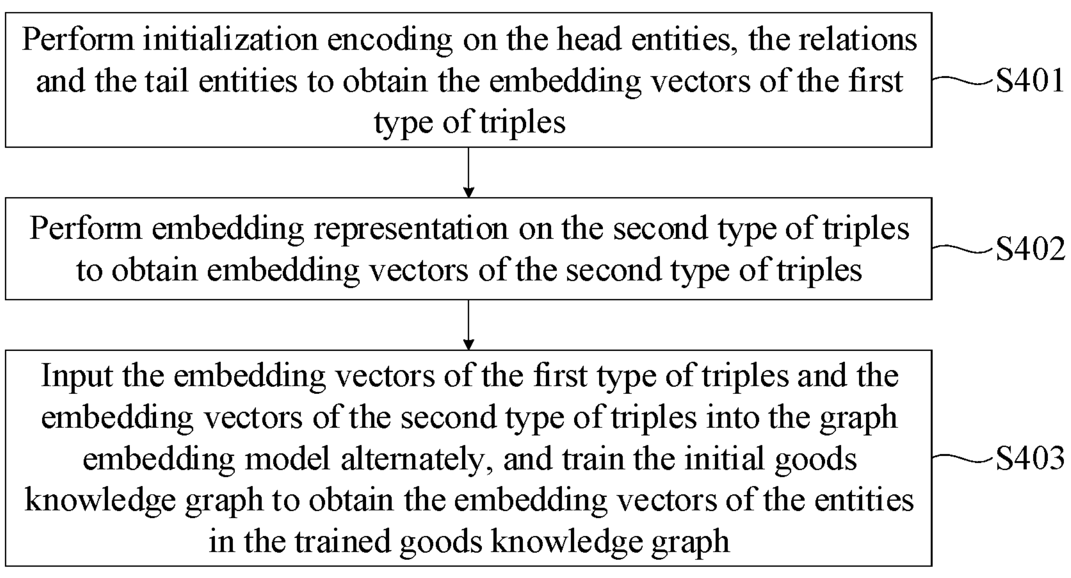
FIG. 5 is a method flowchart of a third implementation mode of step S102 in FIG. 1.

The third implementation mode is as shown in FIG. 5, and correspondingly, the step S102: training the initial goods knowledge graph based on a graph embedding model to obtain embedding vectors of entities in the trained goods knowledge graph includes the following.

S401: performing initialization encoding on the head entities, the relations and the tail entities to obtain the embedding vectors of the first type of triples; S402: performing embedding representation on the second type of triples to obtain the embedding vectors of the second type of triples; and S403: inputting the embedding vectors of the first type of triples and the embedding vectors of the second type of triples into the graph embedding model alternately, and training the initial goods knowledge graph to obtain the embedding vectors of the entities in the trained goods knowledge graph.

In a particular implementation process, initialization encoding is performed on the head entities, the relations and the tail entities in the first type of triples, so as to determine initial vectors of the head entities, the relations and the tail entities in the first type of triples. Then the embedding vectors of the first type of triples are obtained according to the initial vectors of the head entities, the relations and the tail entities in the first type of triples. The embedding vectors of the second type of triples are obtained by performing embedding representation on the second type of triples. After the embedding vectors of the first type of triples and the embedding vectors of the second type of triples are obtained, the embedding vectors of the first type of triples and the embedding vectors of the second type of triples may be input into the graph embedding model alternately, and the initial goods knowledge graph are trained to obtain the trained goods knowledge graph, so as to obtain the embedding vectors of the entities in the trained goods knowledge graph according to the trained goods knowledge graph.

In a practical study, the present inventors have found that when training an initial goods knowledge graph by using a graph embedding model, still taking FIG. 2 as an example, there is a problem when the relations between nodes are one-to-many, many-to-one and many-to-many. Specifically, under the condition that the initial goods knowledge graph is trained by using only the first type of triples of a single format (head entity, relation, tail entity), different tail entities connected to the same head entity will get similar embedded representations in a one-to-many structure as shown in FIG. 2. Under the condition that these tail entities are not distinguished, the accuracy of subsequent goods recommendation will be greatly influenced. The present inventors have found that alternately inputting the embedding vectors of the first type of triples and the embedding vectors of the second type of triples into the graph embedding model and training the initial goods knowledge graph to obtain the trained goods knowledge graph may improve discrimination of the entities in the trained goods knowledge graph, and the accuracy of goods recommendation is improved when the trained goods knowledge graph is used for recommending goods subsequently.

Figure 6:
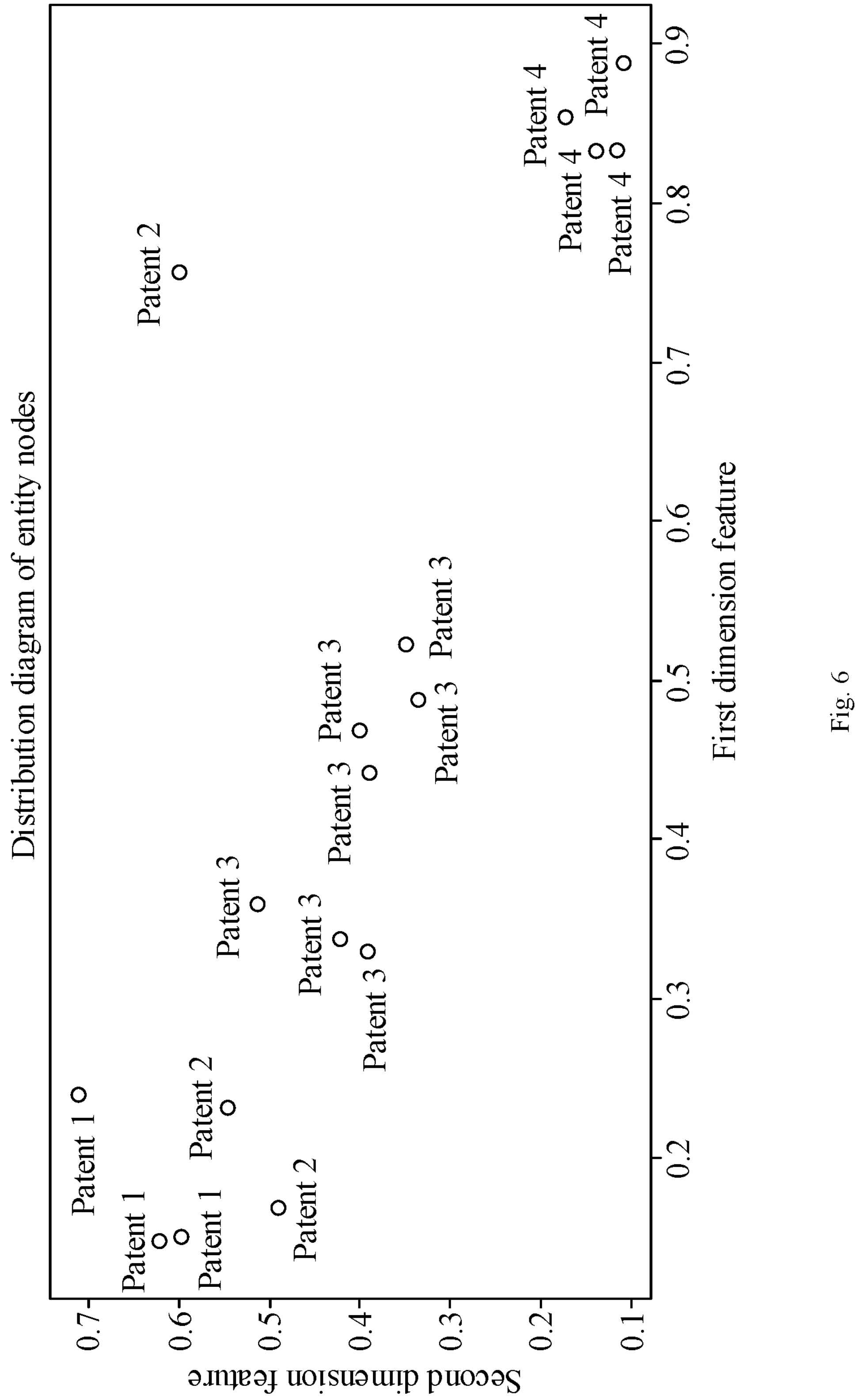
FIG. 6 is a distribution diagram of entity nodes determined based on a trained goods knowledge graph in a method for training a goods knowledge graph according to an embodiment of the present disclosure.

FIG. 6 is a distribution diagram of entity nodes determined based on the trained goods knowledge graph. In FIG. 5, four classes of patents of patent 1, patent 2, patent 3 and patent 4 are included, and the four classes of patents belong to different applicants. It can be seen from FIG. 6 that inter-class distances of the four classes of trained patents are greater than intra-class distances of the four classes of trained patents, and thus the four classes of patents are easily distinguished, and the discrimination of the intra-class entities is also desirable. In a particular implementation process, the embedding vectors of the first type of triples and the embedding vectors of the second type of triples are input into the graph embedding model alternately, and the initial goods knowledge graph is trained, and the obtained embedding vectors of the entities in the trained goods knowledge graph have better discrimination. The trained goods knowledge graph is used in goods recommendation based on the graph convolution network model, so as to effectively improve the accuracy of goods recommendation.

Based on the above disclosed concept, in one illustrative embodiment, embedding vectors of a first type of triples may be input into a graph embedding model first to train an initial goods knowledge graph, then embedding vectors of a second type of triples may be input into the graph embedding model to continue to train the goods knowledge graph, the embedding vectors of the first type of triples may be input into the graph embedding model to continue to train the goods knowledge graph, and then the embedding vectors of the second type of triples may be input into the graph embedding model, so as to continue to train the goods knowledge graph cyclically. The discrimination of the entities in the goods knowledge graph is improved.

In one illustrative embodiment, embedding vectors of a second type of triples may be input into a graph embedding model first to train an initial goods knowledge graph, then embedding vectors of a first type of triples may be input into the graph embedding model to continue to train the goods knowledge graph, the embedding vectors of the second type of triples may be input into the graph embedding model to continue to train the goods knowledge graph, and then the embedding vectors of the first type of triples may be input into the graph embedding model, so as to continue to train the goods knowledge graph cyclically. The discrimination of the entities in the goods knowledge graph is improved.

In the embodiment of the present disclosure, attributes in triples are distinguished from entities. In practical applications, attribute values corresponding to attributes in triples may include an attribute value of a text type and further include an attribute value of a digital type. For example, in a movie knowledge graph, as for a triple (Forrest Gump, filming location, USA), "Forrest Gump" is an entity, "filming location" is an attribute, and "USA" is an attribute value. As for a triple (Forrest Gump, show date, 1994), "Forrest Gump" is an entity, "show date" is an attribute, and "1994" is an attribute value.

In a particular implementation process, embedding representation may be performed on the second type of triples according to the types of the attribute values of the second type of triples, so as to obtain embedding vectors of the second type of triples. Correspondingly, as for step S301 or step S402: performing embedding representation on the second type of triples to obtain embedding vectors of the second type of triples, there may be two implementation modes as follows but are not limited to the two implementation modes.

Figure 7:
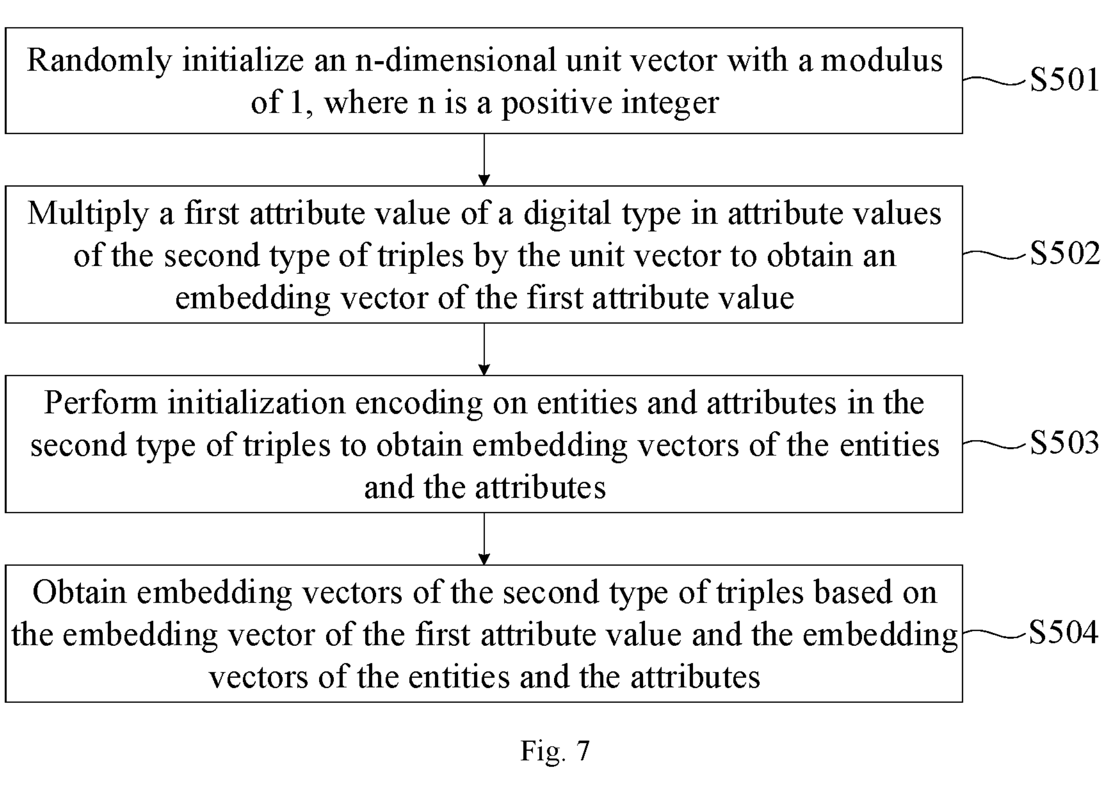
FIG. 7 is a method flowchart of a first implementation mode of step S301 in FIG. 4 or S402 in FIG. 5.

In the embodiment of the present disclosure, as shown in FIG. 7, the first implementation mode includes the following.

S501: randomly initializing an n-dimensional unit vector with a modulus of 1, where n is a positive integer; S502: multiplying a first attribute value of a digital type in attribute values of the second type of triples by the unit vector to obtain an embedding vector of the first attribute value; S503: performing initialization encoding on entities and attributes in the second type of triples to obtain corresponding embedding vectors of the entities and the attributes; and S504: obtaining embedding vectors of the second type of triples based on the embedding vector of the first attribute value and the corresponding embedding vectors of the entities and the attributes.

In a particular implementation process, a particular implementation process of S501 to S504 is as follows.

Firstly, the n-dimensional unit vector with a modulus of 1 is randomly initialized, where n is a positive integer, and the n-dimensional unit vector may be subject to a Gaussian distribution. Then the first attribute value of a digital type in the attribute values of the second type of triples is multiplied by the unit vector to obtain the embedding vector of the first attribute value, and a corresponding formula is represented as follows:

$$E_n = [e_1, e_2, \ldots, e_n];$$

$$e_{NE} = [x_i \cdot e_1, x_i \cdot e_1, \ldots, x_i \cdot e_n].$$

Where $E_n$ represents a basis vector of the n-dimensional unit vector, $x_i$ represents a first attribute value, and $e_{NE}$ represents the embedding vector of the first attribute value.

It should be noted that in the embodiment of the present disclosure, the different attribute values have different corresponding $E_n$, such that the discrimination between the different attribute values is guarantee, so as to guarantee that the entities in the triples have better discrimination.

In a particular implementation process, initialization encoding may also be performed on the entities and the attributes in the second type of triples, so as to obtain the corresponding embedding vectors of the entities and attributes in the second type of triples, and then the embedding vectors of the second type of triples are obtained based on the embedding vector of the first attribute value and the corresponding embedding vectors of the entities and the attributes.

Figure 8:
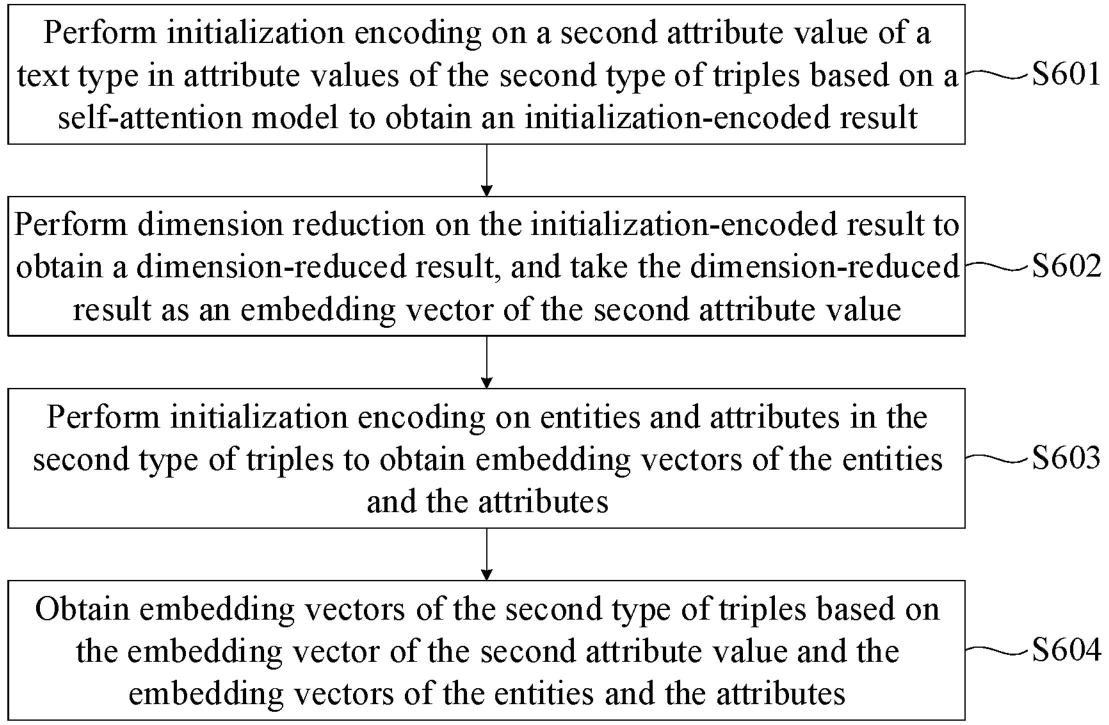
FIG. 8 is a method flowchart of a second implementation mode of step S301 in FIG. 4 or S402 in FIG. 5.

In an embodiment of the present disclosure, as shown in FIG. 8, the second implementation mode includes the following.

S601: performing initialization encoding on a second attribute value of a text type in attribute values of the second type of triples based on a self-attention model to obtain an initialization-encoded result; S602: performing dimension reduction on the initialization-encoded result to obtain a dimension-reduced result, and taking the dimension-reduced result as an embedding vector of the second attribute value; S603: performing initialization encoding on entities and attributes in the second type of triples to obtain corresponding embedding vectors of the entities and the attributes; and S604: obtaining embedding vectors of the second type of triples based on the embedding vector of the second attribute value and the corresponding embedding vectors of the entities and the attributes.

In a particular implementation process, a particular implementation process of S601 to S604 is as follows.

Firstly, initialization encoding is performed on the attribute value of a text type in the attribute values of the second type of triples based on the self-attention model to obtain the initialization-encoded result. The self-attention model may be pre-constructed, may be a BERT model, or may be a self-attention transformer model, which is not limited herein. In one illustrative embodiment, initialization encoding may be performed on the attribute value of a text type in the attribute values of the second type of triples by using the BERT model, where the BERT model is essentially composed of a plurality of Transformer encoder in a stacking manner, and may divide an input sentence into words, add a flag bit [CLS] in front to represent the start of the sentence, and take a 768-dimensional vector encoded by [CLS] as an embedding representation of the whole sentence vector. Based on the same processing principle, the embedding vector of the second attribute value may be obtained. Since the dimension of the vector obtained by the BERT model is usually 768, the computational overhead is large.

In the embodiment of the present disclosure, in order to reduce the vector dimension while retaining semantic information, the step S602: performing dimension reduction on the initialization-encoded result to obtain a dimension-reduced result includes the following. Dimension reduction is performed on the initialization-encoded result by means of an intermediate layer network structure of an autoencoder to obtain the dimension-reduced result.

In a particular implementation process, after the initialization-encoded result is obtained by means of the BERT model, dimension reduction may be performed on the initialization-encoded result by means of the intermediate layer network structure of the autoencoder as shown in FIG. 9 to obtain the dimension-reduced result, and the dimension-reduced result may be taken as the embedding vector of the second attribute value subsequently. The autoencoder is of a pre-constructed symmetric network structure, and before using the intermediate layer network structure of the autoencoder to perform dimension reduction on the initialization-encoded result, the autoencoder may be pre-trained to obtain a trained autoencoder, and then dimension reduction may be performed on the initialization-encoded result based on the intermediate layer network structure of the trained autoencoder. In FIG. 9, the number of neurons in the intermediate layer network structure is the dimension n that is required to be reduced to. In one exemplary embodiment, n may have a value of 16, and n may also have a value of 32, which can be set according to practical application requirements, and is not limited herein.

Still in combination with FIG. 9, the autoencoder is of a pre-constructed symmetric network structure, the symmetric network structure includes a first network structure 10 located in the left half, an intermediate layer network structure 20, and a second network structure 30 located in the right half. The intermediate layer network structure 20 may be a hidden layer h, and the first network structure is responsible for receiving an input x, and reducing the dimension of the input x by means of a function $f$ to obtain the hidden layer h.

$$h = f(x)$$

$$f(x) = \sigma\left(\sum_k \omega_{jk}^l x_k^{l-1} + b_j^l\right)$$

Wherein l represents the $l^{th}$ layer of the network, k represents the $k^{th}$ neuron, and j represents the $j^{th}$ neuron of the $l^{th}$ layer.

The second network structure 30 is used for taking the hidden layer h as an input, and obtaining a reconstructed output y by means of a function g.

$$y = g(h) = g(f(x))$$

Finally, the autoencoder as shown in FIG. 9 is trained by using a cross entropy loss function, and a corresponding formula is:

$$L(x, y) = -\sum_{i=1}^{d_x} x, \log(y_i) + (1 - x_i)\log(1 - y_i).$$

Where x and y represent an input value and an output value of the network structure shown in FIG. 9 respectively, when the autoencoder is trained, it is necessary to keep an error between x and y as small as possible, that is, the values of x and y are as equal as possible.

In a particular implementation process, initialization encoding may also be performed on the entities and the attributes in the second type of triples, so as to obtain the corresponding embedding vectors of the entities and attributes, and then the embedding vectors of the second type of triples may be obtained based on the embedding vector of the second attribute value and the corresponding embedding vectors of the entities and the attributes. Moreover, in a particular implementation process, initialization encoding may be performed on the head entities, the relations and the tail entities in the first type of triples based on the self-attention model, then dimension reduction is performed on an initialization-encoded result to obtain a dimension-reduced result, and the dimension-reduced result is taken as a corresponding embedding vector. Reference may be made to a process of reducing the attribute values of a text type of the second type of triples into the required embedding vectors for a concrete implementation process, which will not be described in detail herein.

It should be noted that a loss function for inputting the embedding vectors of the first type of triples into the graph embedding model and training the initial goods knowledge graph is.

$$\ell_e = \sum_{(h,r,t)\in S} \sum_{(h',r,t')\in S'} [\gamma + d(h+r, t) - d(h'+r, t')]_+.$$

Where $[x]_+$ represents that x takes an absolute value, that is, its minimum value is greater than 0, x refers to the content in $[\ ]_+$, and $\gamma>0$ is an edge distance superparameter. h',t' is a negative sample, and represents a head entity or a tail entity randomly replaced in a triple of the initial goods knowledge graph.

A loss function for inputting the embedding vectors of the second type of triples into the graph embedding model and training the initial goods knowledge graph is:

$$\ell_a = \sum_{a(a,p,v)\in S} \sum_{(a,p,v')\in S'} [\gamma + d(a+p, e) - d(a+p, e')]_+.$$

Where e represents an entity, a represents an attribute, and p represents an attribute value.

In a particular implementation process, the first type of triples and the second type of triples may be input into the graph embedding model alternately, and loss training is performed on the initial goods knowledge graph to obtain the embedding vectors of the entities in the trained goods knowledge graph. Thus, each entity in the trained goods knowledge graph may be converted into an embedding vector, and the distribution of the converted embedding vectors in space basically conforms to a structural representation of the initial goods knowledge graph. In this way, the obtained embedding vectors of the entities in the trained goods knowledge graph not only fuses the relations between the entity and other entities, but also fuses the relations between the entities and their own attributes, so as to guarantee the accuracy of the subsequent goods recommendation based on the embedding vectors of the entities.

Based on the same disclosure concept, as shown in FIG. 10, an embodiment of the present disclosure provides a method for recommending goods. The method for recommending goods may be applied to a system for recommending goods, and goods may be recommended to targeted users by means of the system for recommending goods. The goods may be tangible goods, such as mobile phones, computers, clothing, or ornaments, etc., and may also be intangible goods, such as paper, news, patents, trademarks, or audios and videos, etc.

As shown in FIG. 10, the method for recommending goods includes: S701: obtaining a search request from a user; S702: obtaining a preference probability of the user for goods according to a graph convolution network model trained based on historical goods search information of the user, where the graph convolution network model is constructed based on a trained goods knowledge graph, and the trained goods knowledge graph is obtained by training an initial goods knowledge graph through the training method according to any one of the above items; and S703: outputting a goods recommendation list according to the preference probability.

In a particular implementation process, S701 and S702 have no order of execution, S701 may be executed before S702, S701 may also executed after S702, and S701 and S702 may be performed simultaneously, which is not limited herein. The goods search request may be a request generated automatically by the user triggering a specific event in the system for recommending goods. The specific event may be that the user browses a page for more than a preset time duration, may also be a purchase behavior of the user, and may also be a behavior of inputting goods for search by the user. Certainly, the specific event may be set according to practical application requirements, and is not limited herein.

In a particular implementation process, in the step of obtaining a preference probability of the user for goods according to a graph convolution network model trained based on historical goods search information of the user, the historical goods search information of the user may be pre-stored, and then the graph convolution network model is trained based on the historical goods search information of the user, so as to obtain the preference probability of the user for goods. The goods may be historical goods related to the historical goods search information of the user, and may also be goods other than the historical goods; and correspondingly, the goods may be one or more, which is not limited herein. In one illustrative embodiment, after the step of obtaining the search request from the user, a user id for uniquely identifying the identity of the user may be determined. After the step of obtaining a preference probability of the user for goods according to a graph convolution network model trained based on historical goods search information of the user, a correspondence relation between the user id and the preference probability for goods may be pre-stored. Subsequently, the preference probability of the user id for the corresponding goods may be determined according to the corresponding relation, so as to implement targeted goods recommendation based on the preference probability of the user.

Furthermore, the graph convolution network model is constructed based on the trained goods knowledge graph, and the trained goods knowledge graph is obtained by training the initial goods knowledge graph through the above method for training a goods knowledge graph. Since the entities of the trained goods knowledge graph not only fuses relations between the entities and other entities, but also fuses the relations between the entities and their own attributes, the graph convolution network model is constructed based on the trained goods knowledge graph, and training is performed based on the historical goods search information of the user, so as to guarantee that after determining the goods embedding vector of goods, the goods embedding vector of the goods may be input into the graph convolution network model, such that the preference probability of the user for the goods is obtained, and the accuracy of goods recommendation is increased. Moreover, in a whole process for recommending goods, the preference probability of the user for the goods may be obtained directly based on the graph convolution model trained by the historical goods search information of the user, and the preference probability may be automatically obtained, which guarantees the accuracy of goods recommendation. The graph convolution network model may be a RippleNet model, a knowledge graph convolution network (KGCN) model, and a graph attention network (GAT) model, which is not limited herein.

After obtaining the preference probability of the user for the goods, the goods recommendation list may be output according to the preference probability. The preference probability is used for characterizing whether the user is interested in a corresponding text, and the goods recommendation list includes at least one kind of goods, and may be one or a plurality of goods. In one illustrative embodiment, the method for recommending goods may be applied to a binary classification task. Correspondingly, the preference probability may be "0" or "1", for example, a preference probability greater than 0.5 is taken as "1", indicating that the user is interested in the goods, and accordingly, a preference probability less than or equal to 0.5 is taken as "0", indicating that the user is not interested in the goods. The goods with the preference probability of "1" are taken as a goods recommendation list, so as to achieve the goods recommendation to the user. In one illustrative embodiment, the method for recommending goods may be applied to a fitting task. Correspondingly, a preference probability corresponds to a particular probability value, ranking is performed according to the probability values, and a goods recommendation list of interest to the user is screened out according to the ranking, so as to achieve goods recommendation to the user. Certainly, the preference probability may be set according to the actual application, which is not limited herein.

The method for recommending goods in the embodiment of the present disclosure is applied to application scenes, such as in a process of the user watching video A, other videos B and C of interest to the user are automatically pushed, even official accounts of interest to the user, etc. As another example, the user inputs the name of goods to be searched "water cup" into the system for recommending goods, and the system for recommending goods recommends all types of cups, such as glasses, ceramic cups, thermos cups, etc. of interest to the user according to an interest level of the user. Certainly, the method for recommending goods may further be applied to other scenes, which is not limited herein.

It should be noted that a particular training process for the initial goods knowledge graph may be described with reference to the relevant sections above, which will not be described in detail herein.

Figure 11:
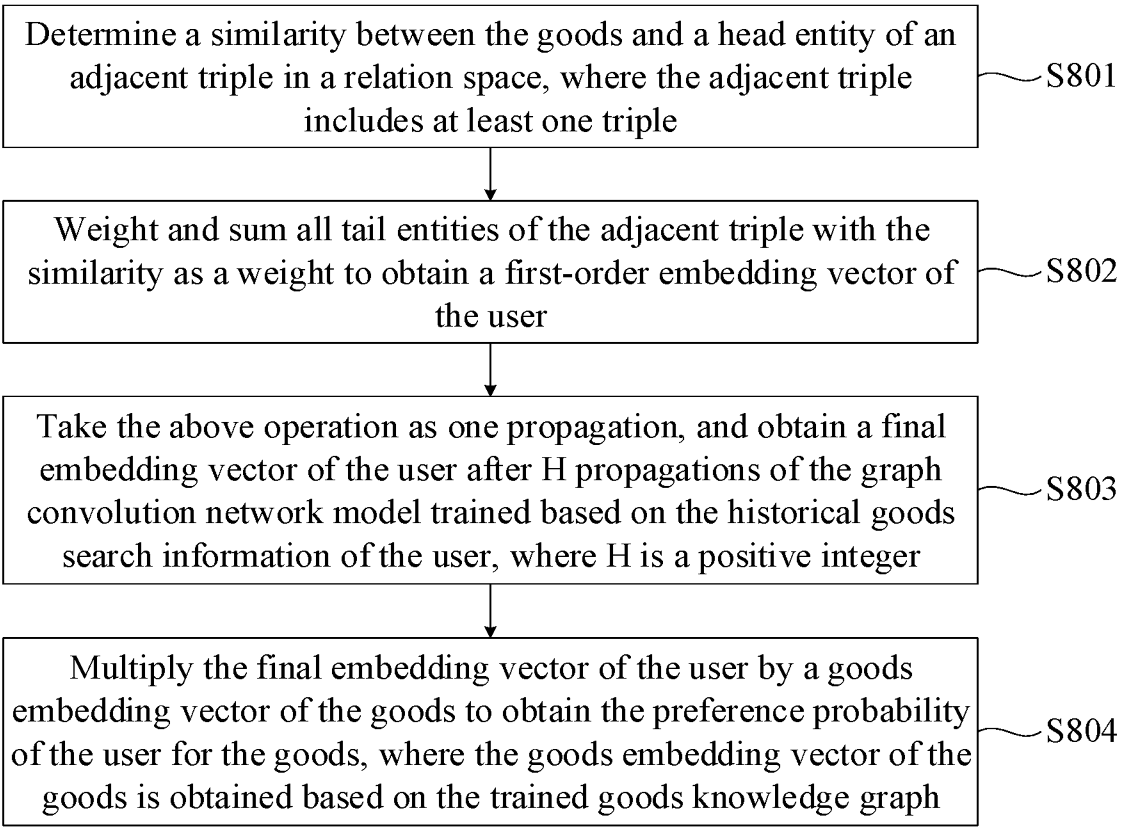
FIG. 11 is one of method flowcharts of step S702 in FIG. 10.

In an embodiment of the present disclosure, as shown in FIG. 11, the step S702: obtaining a preference probability of the user for goods according to a graph convolution network model trained based on historical goods search information of the user includes: S801: determining a similarity between the goods and a head entity of an adjacent triple in a relation space, where the adjacent triple includes at least one triple; S802: weighting and summing all tail entities of the adjacent triple with the similarity as a weight to obtaining a first-order embedding vector of the user; S803: taking the above operation as one propagation, and obtaining a final embedding vector of the user after H propagations of the graph convolution network model trained based on the historical goods search information of the user, where H is a positive integer; and S804: multiplying the final embedding vector of the user by a goods embedding vector of the goods to obtain the preference probability of the user for the goods, where the goods embedding vector of the goods is obtained based on the trained goods knowledge graph.

Figure 12:
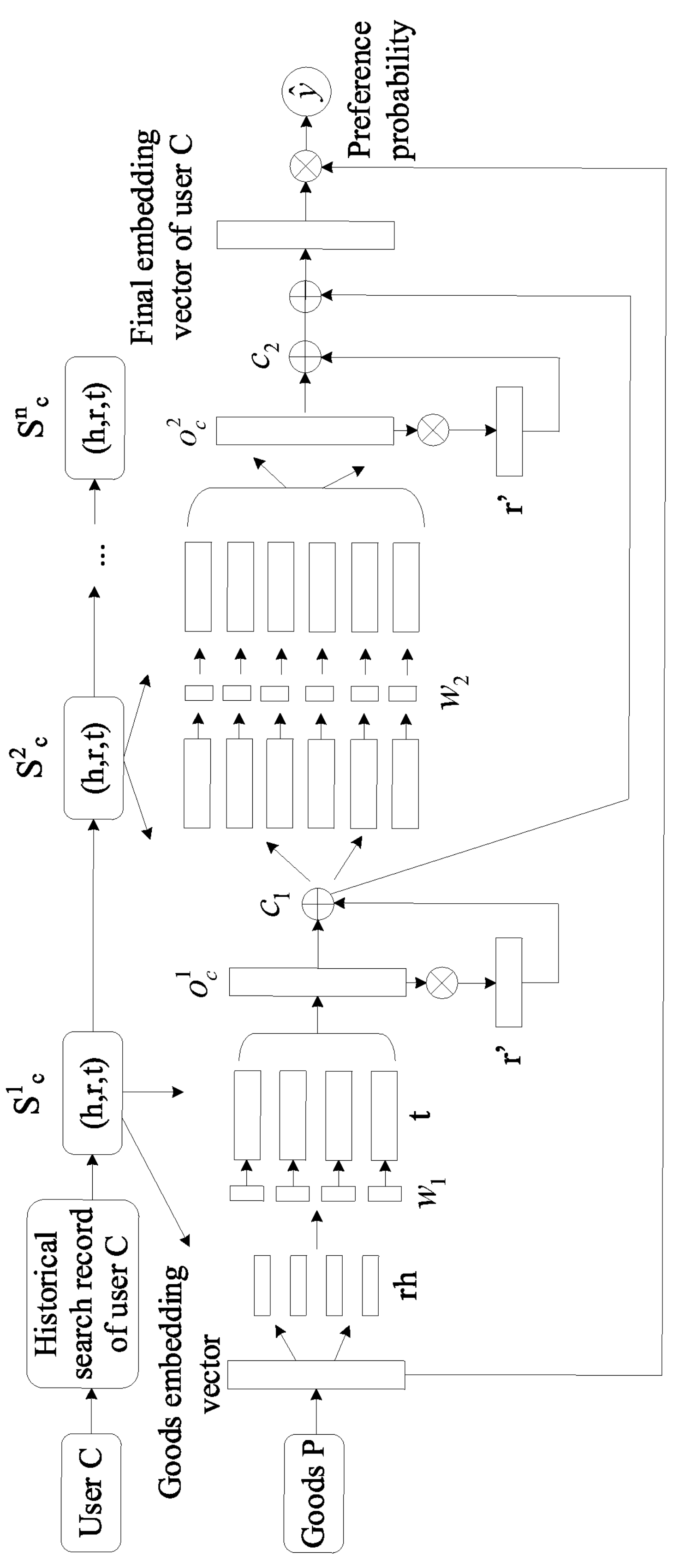
FIG. 12 is one of schematic structural diagrams of a model for recommending goods in a method for recommending goods according to an embodiment of the present disclosure.

In a particular implementation process, the graph convolution network model may be a model based on RippleNet. A particular implementation process of S801 to S804 is explained correspondingly in conjunction with a model for recommending goods as shown in FIG. 12.

Figure 13:
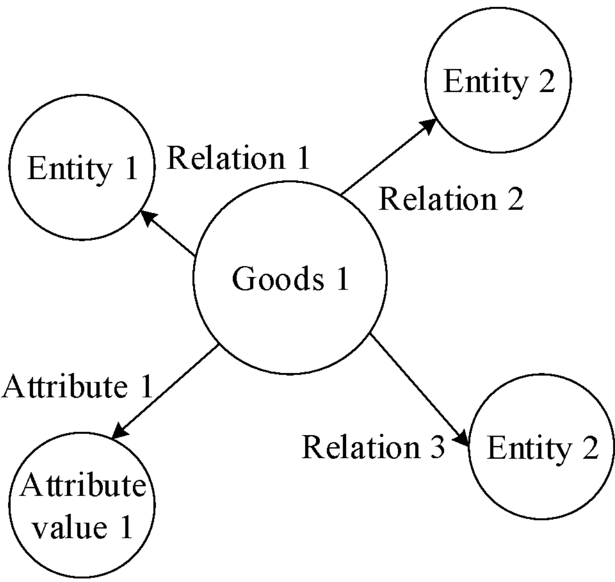
FIG. 13 is one of schematic hop diagrams in a method for recommending goods according to an embodiment of the present disclosure.

Firstly, a similarity between the goods and the head entity of the adjacent triple in a relation space is determined, where the adjacent triple includes at least one triple, and may be one or a plurality of triples, which is not limited herein. It can be understood that the head entity is a set of goods, and the tail entity is the similarity of the triple in which the head entity is located in the r-space. It should be noted that the head entity is an initial embedding vector, and the head entities in adjacent triples may be the embedding vectors determined according to the trained goods knowledge graph. A higher similarity indicates a tighter relation between the head entity in the adjacent triple and the goods. With goods P as a head entity, a relation r and a tail entity h are searched for from the head entity P, and such a complete triple is called a hop. In conjunction with a hop diagram as shown in FIG. 13, adjacent triples of goods 1 include four triples, that is, goods 1-relation 1-entity 1, goods 1-relation 2-entity 2, goods 1-relation 3-entity 3, and goods 1-attribute 1-attribute value 1. When the next hop triple starts, the tail entity of the previous hop triple is used as the head entity of the next hop triple for continuous computation to achieve "propagation" mentioned below.

The similarity between the goods and the head entities of the adjacent triples in the relation space may be computed by using the following formula:

$$\omega_i = \text{soft max}\left(p^T R_i h_i\right) = \frac{\exp\left(p^T R_i h_i\right)}{\sum_{(h,r,t)\in S_c'} \exp\left(p^T R h\right)}.$$

Where i is a positive integer greater than 0 and less than or equal to H, p represents a goods embedding vector of goods, $$S_c'$$

represents a neighborhood set of the goods in a trained knowledge graph, h represents a head entity, t represents a tail entity, and R represents a relation matrix.

Then, all the tail entities of the adjacent triples are weighted and summed with the similarity as a weight to obtain the first-order embedding vector of the user.

The first-order embedding vector of the user may be computed by using the following formula:

$$O_c^1 = \sum_{(h_1,r_1,t_1)\in S_c'} w_1 t_1.$$

Correspondingly, the $i^{th}$ order embedding vector of the user is $$O_c^i = \sum_{(h_i,r_i,t_i)\in S_c'} w_i t_i.$$

Then, the above operation is taken as one propagation, and a final embedding vector of the user is obtained after H propagations of the graph convolution network model trained based on the historical goods search information of the user, where H is a positive integer.

In a particular implementation process, a result of adding all orders of embedding vectors of the user may be taken as the final embedding vector of the user, and the following formula may be used to obtain the final embedding vector of the user:

$$C = c_1 + c_2 + \ldots + c_i + \ldots + c_H.$$

Where $$c_i = o_c^i,$$

is a positive integer greater than 0 and less than or equal to H.

After the final embedding vector of the user is obtained, the final embedding vector of the user may be multiplied by the goods embedding vector of the goods to obtain the preference probability of the user for the goods, where the goods embedding vector of the goods is obtained based on the trained goods knowledge graph. A training process of the goods knowledge graph may be described with reference to the relevant sections above, which will not be described in detail herein.

In one illustrative embodiment, the method for recommending goods in an embodiment of the present disclosure may be applied to a binary classification task, and accordingly, after the final embedding vector of the user is obtained, the preference probability of the user for the goods may be computed by using the following formula:

$$\hat{y}_{cp} = \sigma(C^T p).$$

Where σ represents a sigmoid activation function.

In one illustrative embodiment, the method for recommending goods in an embodiment of the present disclosure may be applied to a fitting task, and accordingly, after the final embedding vector of the user is obtained, the preference probability of the user for the goods may be obtained by using the following formula:

$$\hat{y}_{cp} = (C^T \cdot W_C + b_C) \cdot p.$$

Where $W_C$ represents a weight coefficient, and $b_C$ is a bias.

In an embodiment of the present disclosure, the first-order embedding vector of the user may be obtained based on a relation capture network to make the first-order embedding vector of the user learn edge relation information between the goods and the head entity of the adjacent triple; and a computational formula of the relation capture network is as follows:

$$c_i = o_c^i + o_c^i \cdot r'.$$

Where i is a positive integer greater than 0 and less than or equal to H, $$o_c^i$$

represents a weighted summation of all tail entities of the adjacent triple with the similarity as a weight for the $i^{th}$ propagation, and r' represents a relation vector.

In a particular implementation process, the relation capture network is essentially a residual error structure, and a relation vector of r may be a relation between the goods and the head entity, may also be a relation between adjacent triples, and may also be a weighting of the two relations.

r' may be computed by using the following formula:

$$r' = W_R \cdot R + b_R.$$

Dimension reduction of the relation matrix R may be implemented based on the above formula. In a graph convolution network structure, the relation matrix is generally two-dimensional, but in the relation capture network, the relation matrix is required to be reduced into one dimension, where $W_R$ is a dimension-reduced matrix, and $b_R$ is a bias.

Figure 14:
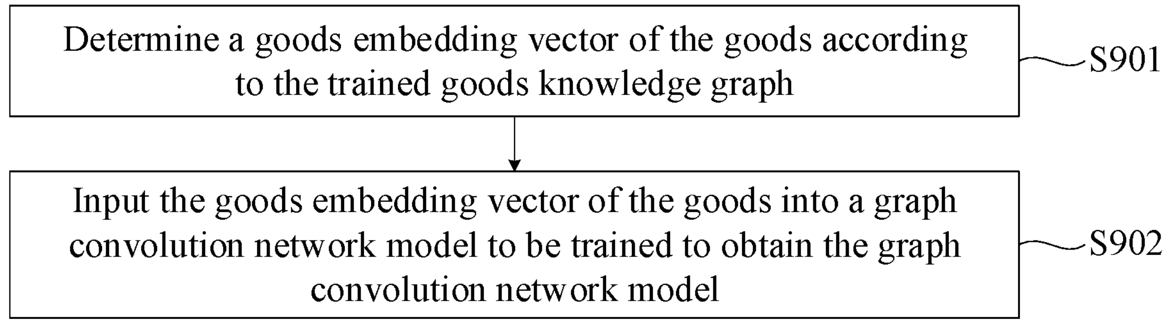
FIG. 14 is one of method flowcharts after step S702 in FIG. 10.

In an embodiment of the present disclosure, as shown in FIG. 14, before the step S702: obtain a preference probability of the user for goods according to a graph convolution network model trained based on historical goods search information of the user, the method further includes: S901: determining a goods embedding vector of the goods according to the trained goods knowledge graph; and S902: inputting the goods embedding vector of the goods into a graph convolution network model to be trained to obtain the graph convolution network model.

In a particular implementation process, a particular implementation process of S901 to S902 is as follows.

Firstly, the goods embedding vector of the goods is determined according to the trained goods knowledge graph, and the goods embedding vector not only fuses the entities of the goods, but also fuses the attribute of the goods. Then, the goods embedding vector of the goods is input into a graph convolution network model to be trained to obtain the trained graph convolution network model. A particular training process of the graph convolution network model may be described with reference to the relevant sections below, which will not be described in detail herein. After the trained graph convolution network model is obtained, recommendation based on the preference probability of the user for goods may be implemented according to the trained graph convolution network model.

Based on the inventive concept of the present disclosure, different recommendation methods are applied to four public data sets including MovieLens-1M, MovieLens-20M, Book-Crossing and Music for binary classification prediction. The recommendation models corresponding to the recommendation methods include the existing RippleNet model, the existing KGCN model, the existing KGCN-LS model, and the graph convolution model mentioned in the present disclosure, evaluation indexes include area under curve (AUC), accuracy (ACC) and F1-score, and experimental results are shown in Table 1.

TABLE 1

| | MovieLens-1M | | | MovieLens-20M | | | Book-Crossing | | | Music | | |
|---|---|---|---|---|---|---|---|---|---|---|---|---|
| Model | AUC | ACC | F1 | AUC | ACC | F1 | AUC | ACC | F1 | AUC | ACC | F1 |
| RippleNet | 0.921 | 0.844 | 0.850 | 0.976 | 0.929 | 0.930 | 0.729 | 0.662 | 0.648 | 0.813 | 0.752 | 0.726 |
| KGCN | 0.914 | 0.839 | 0.844 | 0.978 | 0.931 | 0.932 | 0.681 | 0.626 | 0.626 | 0.801 | 0.719 | 0.714 |
| KGNN-LS | 0.915 | 0.840 | 0.844 | 0.979 | 0.933 | 0.935 | 0.685 | 0.627 | 0.640 | 0.800 | 0.730 | 0.710 |
| Present disclosure | 0.927 | 0.853 | 0.853 | 0.983 | 0.940 | 0.940 | 0.737 | 0.688 | 0.681 | 0.811 | 0.746 | 0.735 |

In conjunction with Table 1, as for the method for recommending goods in the present disclosure, the larger a data set is, the more accurate a prediction result of the preference probability is. Accordingly, the accuracy of goods recommendation to the user based on the preference probability is higher in the present disclosure.

Based on the same disclosure concept, as shown in FIG. 15, an embodiment of the present disclosure further provides a method for training a model. The method for training a model may be used for a system for training a model and includes: S1001: determining a goods embedding vector of goods according to a trained goods knowledge graph, where the trained goods knowledge graph is obtained by training an initial goods knowledge graph through the above method for training a goods knowledge graph; and S1002: inputting the goods embedding vector of the goods into a graph convolution network model to be trained, and training the graph convolution network model to be trained to obtain a graph convolution network model, where the graph convolution network model to be trained is constructed based on the trained goods knowledge graph.

In a particular implementation process, a particular implementation process of S1001 to S1002 is as follows.

Firstly, the goods embedding vector of the goods is determined according to the trained goods knowledge graph. In this way, the goods embedding vector not only fuses the entities of the goods, but also fuses the attributes of the entities. The trained goods knowledge graph is obtained by training an initial goods knowledge graph through the above method for training a goods knowledge graph, and a training process of the goods knowledge graph may be described with reference to the relevant sections above, which will not be described in detail herein. After the goods embedding vector of the goods is determined, the goods embedding vector of the goods is input into a graph convolution network model to be trained, and the graph convolution network model to be trained is trained to obtain a trained graph convolution network model, where the graph convolution network model to be trained is constructed based on the trained goods knowledge graph. The graph convolution network model to be trained may be a RippleNet model, a knowledge graph convolution network (KGCN) model, and a graph attention network (GAT) model, which is not limited herein.

Figure 16:
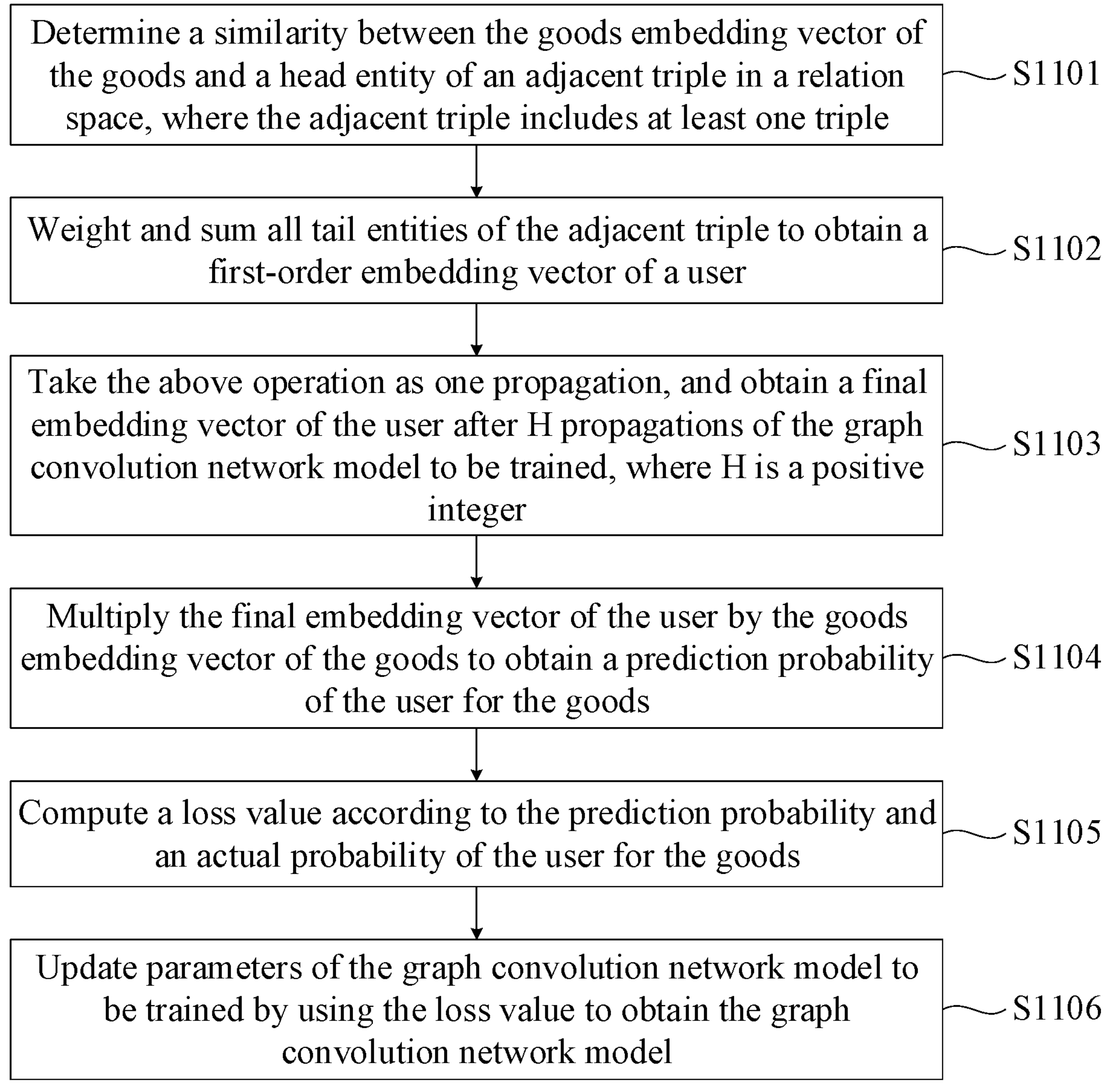
FIG. 16 is one of method flowcharts of step S1002 in FIG. 15.

In an embodiment of the present disclosure, as shown in FIG. 16, the step S1002: inputting the goods embedding vector of the goods into a graph convolution network model to be trained, and train the graph convolution network model to be trained to obtain a graph convolution network model includes: S1101: determining a similarity between the goods embedding vector of the goods and a head entity of an adjacent triple in a relation space, where the adjacent triple includes at least one triple; S1102: weighting and summing all tail entities of the adjacent triple to obtain a first-order embedding vector of a user; S1103: taking the above operation as one propagation, and obtaining a final embedding vector of the user after H propagations of the graph convolution network model to be trained, where H is a positive integer; S1104: multiplying the final embedding vector of the user by the goods embedding vector of the goods to obtain a prediction probability of the user for the goods; S1105: computing a loss value according to the prediction probability and an actual probability of the user for the goods; and S1106: updating parameters of the graph convolution network model to be trained by using the loss value to obtain the graph convolution network model.

In a particular implementation process, a particular implementation process of S1101 to S1106 is as follows.

Firstly, a similarity between the goods and the head entity of the adjacent triple in a relation space is determined, where the adjacent triple includes at least one triple, and may be one or a plurality of triples, which is not limited herein. It can be understood that the head entity is a set of goods, and the tail entity is the similarity of the triple in which the head entity is located in the r-space. It should be noted that the head entity is an initial embedding vector, and the head entities in adjacent triples may be the embedding vectors determined according to the trained goods knowledge graph. A higher similarity indicates a tighter relation between the head entity in the adjacent triple and the goods.

The similarity between the goods and the head entities of the adjacent triples in the relation space may be computed by using the following formula:

$$\omega_i = \text{soft max}\left(p^T R_i h_i\right) = \frac{\exp\left(p^T R_i h_i\right)}{\sum_{(h,r,t)\in S_c^{\prime}} \exp\left(p^T R h\right)}.$$

Where i is a positive integer greater than 0 and less than or equal to H, p represents a goods embedding vector of goods, $$S_c^{\prime}$$

represents a neighborhood set of the goods in a trained knowledge graph, h represents a head entity, t represents a tail entity, and R represents a relation matrix.

Then, all the tail entities of the adjacent triples are weighted and summed with the similarity as a weight to obtain the first-order embedding vector of the user.

The first-order embedding vector of the user may be computed by using the following formula:

$$o_c^1 = \sum_{(h_1, r_1, t_1)\in S_c^{\prime}} w_1 t_1.$$

Correspondingly, the $i^{th}$ order embedding vector of the user is $$o_c^i = \sum\nolimits_{(h_i,r_i,t_i)\in S_c^i} w_i t_i.$$

Then, the above operation is taken as one propagation, and a final embedding vector of the user is obtained after H propagations of the graph convolution network model to be trained, where H is a positive integer.

In a particular implementation process, a result of adding all orders of embedding vectors of the user may be taken as the final embedding vector of the user, and the following formula may be used to obtain the final embedding vector of the user:

$$C = c_1 + c_2 + \ldots\ldots + c_i + \ldots\ldots + c_H.$$

Where $$c_i = o_c^i,$$

i is a positive integer greater than 0 and less than or equal to H.

After the final embedding vector of the user is obtained, the final embedding vector of the user may be multiplied by the goods embedding vector of the goods to obtain a prediction probability of the user for the goods, where the goods embedding vector of the goods is obtained based on the trained goods knowledge graph. A training process of the goods knowledge graph may be described with reference to the relevant sections above, which will not be described in detail herein.

In one illustrative embodiment, the method for training a model in an embodiment of the present disclosure may be applied to a binary classification task, and accordingly, after the final embedding vector of the user is obtained, the prediction probability of the user for the goods may be computed by using the following formula:

$$\hat{y}_{cp} = \sigma(C^T p).$$

Where σ represents a sigmoid activation function.

In one illustrative embodiment, the method for training a model in an embodiment of the present disclosure may be applied to a fitting task, and accordingly, after the final embedding vector of the user is obtained, the prediction probability of the user for the goods may be computed by using the following formula:

$$\hat{y}_{cp} = (C^T \cdot W_C + b_C) \cdot p.$$

Where $W_C$ represents a weight coefficient, and $b_C$ is a bias.

After the prediction probability of the user for the goods obtained, a loss value may be computed according to the prediction probability and an actual probability of the user for the goods, and then parameters of the graph convolution network model to be trained are updated by using the loss value to obtain the graph convolution network model.

In one illustrative embodiment, under the condition that the method for training a model in an embodiment of the present disclosure is applied to a binary classification task, accordingly, the graph convolution network model to be trained is a model for making recommendations based on a binary classification task, the loss value may be computed by using the following formula:

$$\ell = \sum_{i=1}^{n} -\left(y_i \log \sigma(C^T p) + (1 - y_i)\log\left(1 - \sigma(C^T p)\right)\right) + \lambda\left(\|p\|_2^2 + \|E\|_2^2 + \|R\|_2^2\right).$$

Where $y_i$ represents the actual probability, $\sigma(C^T p)$ represents the prediction probability, and p represents the goods embedding vector of the goods.

In one illustrative embodiment, under the condition that the method for training a model in an embodiment of the present disclosure is applied to a fitting task, accordingly, the graph convolution network model to be trained is a model for making recommendations based on a fitting task, and the loss value is computed by using the following formula:

$$\ell = \frac{1}{n}\sum_{i=1}^{n}(y_i - \hat{y}_i)^2 + \lambda\left(\|p\|_2^2 + \|E\|_2^2 + \|R\|_2^2\right).$$

Where $y_i$ represents the actual probability, $\hat{y}_i$ represents the prediction probability, and p represents the goods embedding vector of the goods.

After the corresponding loss value is obtained, the loss value may be used for updating the parameters of the graph convolution network model to be trained, so as to obtain the trained graph convolution network model.

After the graph convolution network model is obtained, the foregoing method for recommending goods may be used for determining the preference probability of the user for the goods based on the graph convolution network model, so as to recommend the goods recommendation list to the user, which guarantees the accuracy of goods recommendation.

In an embodiment of the present disclosure, the first-order embedding vector of the user may be obtained based on a relation capture network to make the first-order embedding vector of the user learn edge relation information between the goods and the head entity of the adjacent triple; and a computational formula of the relation capture network is as follows:

$$c_i = o_c^i + o_c^i \cdot r'.$$

Where i is a positive integer greater than 0 and less than or equal to H, $$o_c^i$$

represents a weighted summation of all tail entities of the adjacent triple with the similarity as a weight for the $i^{th}$ propagation, and r' represents a relation vector.

In a particular implementation process, the relation capture network is essentially a residual error structure, and a relation vector of r may be a relation between the goods and the head entity, may also be a relation between adjacent triples, and may also be a weighting of the two relations.

r' may be computed by using the following formula:

$$r' = W_R \cdot R + b_R.$$

Dimension reduction of the relation matrix R may be implemented based on the above formula. In a graph convolution network structure, the relation matrix is generally two-dimensional, but in the relation capture network, the relation matrix is required to be reduced into one dimension, where $W_R$ is a dimension-reduced matrix, and $b_R$ is a bias.

In an embodiment of the present disclosure, under the condition that a model structure shown in FIG. 15 is used for evaluating a degree of preference of the user for the goods accordingly, and the evaluation preference is:

$$\hat{y}_{cp} = (C^T \cdot W_C + b_C) \cdot p.$$

After the final embedding vector of the user is obtained, the loss value is computed according to the evaluation preference and the actual preference ($y_i$) of the user for the goods, and the loss value may be computed by using the following formula:

$$\ell = \frac{1}{n}\sum_{i=1}^{n}(y_i - \hat{y}_i)^2 + \lambda(\|p\|_2^2 + \|E\|_2^2 + \|R\|_2^2).$$

It should be noted that the method for training a model according to the embodiment of the present disclosure solves the problem in a manner similar to the foregoing method for recommending goods, and a related implementation process may be described with reference to the relevant sections of the foregoing method for recommending goods, which will not be repeated herein.

Based on the same disclosure concept, an embodiment of the present disclosure further provides a device for training a goods knowledge graph. The device includes: a first memory and a first processor; where the first memory is configured for storing a computer program; and the first processor is configured for executing the computer program in the first memory to implement the following steps: constructing an initial goods knowledge graph based on a first type of triples and a second type of triples, where a format of the first type of triples is head entity-relation-tail entity, and a format of the second type of triples is entity-attribute-attribute value; and training the initial goods knowledge graph based on a graph embedding model to obtain embedding vectors of entities in the trained goods knowledge graph.

Based on the same disclosure concept, an embodiment of the present disclosure further provides a device for recommending goods. The device includes: a second memory and a second processor; where the second memory is configured for storing a computer program; and the second processor is configured for executing the computer program in the second memory to implement the following steps: obtaining goods search request information input by a user; obtaining a preference probability of the user for goods according to a graph convolution network model trained based on historical goods search information of the user, where the graph convolution network model is constructed based on a trained goods knowledge graph, and the trained goods knowledge graph is obtained by training an initial goods knowledge graph through the method for training a goods knowledge graph according to any one of the above items; and outputting a goods recommendation list according to the preference probability.

Based on the same disclosure concept, an embodiment of the present disclosure further provides a device for training a model. The device includes: a third memory and a third processor; where the third memory is configured for storing a computer program; and the third processor is configured for executing the computer program in the third memory to implement the following steps: determining a goods embedding vector of goods according to a trained goods knowledge graph, where the trained goods knowledge graph is obtained by training an initial goods knowledge graph through the training method according to any one of the above items; and inputting the goods embedding vector of the goods into a graph convolution network model to be trained, and training the graph convolution network model to be trained to obtain a graph convolution network model, where the graph convolution network model to be trained is constructed based on the trained goods knowledge graph.

Based on the same disclosure concept, an embodiment of the present disclosure further provides a computer-readable storage medium. When a computer instruction runs on a computer, the computer is made to execute the method for training a goods knowledge graph according to any one of the above items, the method for recommending goods according to any one of the above items, or the method for training a model according to any one of the above items.

Those skilled in the art will appreciate that embodiments of the present disclosure can be provided as a method, system, or computer program product. Thus, the present disclosure can take the form of an entire hardware embodiment, an entire software embodiment or an embodiment combining software and hardware aspects. Furthermore, the present disclosure can take the form of a computer program product implemented on one or more computer-available storage media (including but not limited to a magnetic disk memory, a compact disc read-only memory (CD-ROM) an optical memory, etc.) encompassing computer-available program codes.

The present disclosure is described with reference to flowcharts and/or block diagrams of a method, an apparatus (system), and a computer program product according to the present disclosure. It will be understood that each flow and/or block of the flowcharts and/or block diagrams, and combinations of flows and/or blocks in the flowcharts and/or block diagrams can be implemented by computer program instructions. These computer program instructions can be provided for a processor of a general purpose computer, a special-purpose computer, an embedded processor, or other programmable data processing devices to generate a machine, such that the instructions, which are executed by the processor of the computer or other programmable data processing devices, can generate apparatuses for implementing functions specified in one or more flows in the flowcharts and/or one or more blocks in the block diagrams.

These computer program instructions can also be stored in a computer-readable memory that can direct the computers or other programmable data processing devices to work in a particular manner, such that the instructions stored in the computer-readable memory generate an article of manufacture including an instruction apparatus that implements the functions specified in one or more flows in the flowcharts and/or one or more blocks in the block diagrams.

These computer program instructions can also be loaded onto the computers or other programmable data processing devices to execute a series of operational steps on the computers or other programmable devices so as to generate a process implemented by the computers, such that the instructions that are executed by the computers or other programmable devices provide steps for implementing the functions specified in one or more flows in the flowcharts and/or one or more blocks in the block diagrams.

While the preferred embodiments of the present disclosure have been described, additional alterations and modifications to those embodiments may be made by those skilled in the art once the basic inventive concept is apparent to those skilled in the art. Thus, it is intended that the appended claims is to be interpreted to include the preferred embodiments and all alterations and modifications that fall within the scope of the present disclosure.

Apparently, those skilled in the art can make various amendments and variations to the present disclosure without departing from the spirit and scope of the present disclosure. In this way, if modifications and variations to the present disclosure fall within the scope of the claims of the present disclosure and their equivalents, it is intended that the present disclosure also encompass these amendments and variations.

What is claimed is:

1. A method for recommending goods, comprising:

obtaining a search request from a user;

obtaining a preference probability of the user for goods according to a graph convolution network model trained based on historical goods search information of the user, wherein the graph convolution network model is constructed based on a trained goods knowledge graph, and the trained goods knowledge graph is obtained by training an initial goods knowledge graph through a method comprising:

constructing the initial goods knowledge graph based on a first type of triples and a second type of triples, wherein a format of the first type of triples is head entity-relation-tail entity, and a format of the second type of triples is entity-attribute-attribute value; and training the initial goods knowledge graph based on a graph embedding model to obtain embedding vectors of entities in the trained goods knowledge graph; and outputting a goods recommendation list according to the preference probability;

wherein the obtaining the preference probability of the user for goods according to the graph convolution network model trained based on historical goods search information of the user comprises:

determining a similarity between the goods and a head entity of an adjacent triple in a relation space, wherein the adjacent triple comprises at least one triple;

weighting and summing all tail entities of the adjacent triple with the similarity as a weight to obtain a first-order embedding vector of the user;

taking the above operation as one propagation, and obtaining a final embedding vector of the user after H propagations of the graph convolution network model trained based on the historical goods search information of the user, wherein H is a positive integer; and multiplying the final embedding vector of the user by a goods embedding vector of the goods to obtain the Preference Probability of the user for the goods, wherein the goods embedding vector of the goods is obtained based on the trained goods knowledge graph;

wherein the first-order embedding vector of the user is obtained based on a relation capture network to make the first-order embedding vector of the user learn edge relation information between the goods and the head entity of the adjacent triple; and a computational formula of the relation capture network is as follows:

$$c_i = o_c^i + o_c^i \cdot r';$$

wherein $c_i$ is an $i^{th}$ output of the relation capture network, $$o_c^i$$

represents a weighted summation of all tail entities of the adjacent triple with the similarity as a weight for an $i^{th}$ propagation, r' represents a relation vector, i is a positive integer greater than 0 and less than or equal to H, and H is a positive integer;

wherein $$o_c^i = \sum\nolimits_{(h_i, r_i, t_i) \in S_c'} \omega_i t_i;$$

wherein $h_i$ represents an $i^{th}$ head entity, $t_i$ represents an $i^{th}$ tail entity, $r_i$ represents a relation between the $i^{th}$ head entity and the $i^{th}$ tail entity, $$S_c'$$

represents a neighborhood set of the goods in a trained knowledge graph, $\omega_i$ represents an $i^{th}$ similarity, i is a positive integer greater than 0 and less than or equal to H, and H is a positive integer;

wherein the $i^{th}$ similarity $\omega_i$ between the goods and the head entities of the adjacent triples in the relation space is computed by using a following formula:

$$\omega_i = softmax\left(p^T R_i h_i\right) = \frac{\exp\left(p^T R_i h_i\right)}{\sum\nolimits_{(h,r,t) \in S_c'} \exp\left(p^T R h\right)};$$

wherein softmax( ) represents a differentiable, normalized exponential function, exp( ) represents an exponential function, p represents a goods embedding vector of goods, $p^T$ represents a transpose of p, R represents a relation matrix, $R_i$ represents an $i^{th}$ component of the relation matrix R, i is a positive integer greater than 0 and less than or equal to H, and H is a positive integer.

2. The method according to claim 1, wherein before the obtaining the preference probability of the user for goods according to the graph convolution network model trained based on the historical goods search information of the user, the method further comprises:

determining a goods embedding vector of the goods according to the trained goods knowledge graph; and inputting the goods embedding vector of the goods into a graph convolution network model to be trained to obtain the graph convolution network model.

3. The method according to claim 1, wherein the training the initial goods knowledge graph based on the graph embedding model to obtain embedding vectors of entities in the trained goods knowledge graph comprises:

performing initialization encoding on head entities, relations and tail entities to obtain embedding vectors of the first type of triples; and inputting the embedding vectors of the first type of triples into the graph embedding model, and training the initial goods knowledge graph to obtain the embedding vectors of the entities in the trained goods knowledge graph.

4. The method according to claim 1, wherein the training the initial goods knowledge graph based on the graph embedding model to obtain embedding vectors of entities in the trained goods knowledge graph comprises:

performing embedding representation on the second type of triples to obtain embedding vectors of the second type of triples; and inputting the embedding vectors of the second type of triples into the graph embedding model, and training the initial goods knowledge graph to obtain the embedding vectors of the entities in the trained goods knowledge graph.

5. The method according to claim 4, wherein the performing embedding representation on the second type of triples to obtain embedding vectors of the second type of triples comprises:

randomly initializing an n-dimensional unit vector with a modulus of 1, wherein n is a positive integer;

multiplying a first attribute value of a digital type in attribute values of the second type of triples by the unit vector to obtain an embedding vector of the first attribute value;

performing initialization encoding on entities and attributes in the second type of triples to obtain embedding vectors of the entities and the attributes; and obtaining embedding vectors of the second type of triples based on the embedding vector of the first attribute value and the embedding vectors of the entities and the attributes.

6. The method according to claim 4, wherein the performing embedding representation on the second type of triples to obtain embedding vectors of the second type of triples comprises:

performing initialization encoding on a second attribute value of a text type in attribute values of the second type of triples based on a self-attention model to obtain an initialization-encoded result;

performing dimension reduction on the initialization-encoded result to obtain a dimension-reduced result, and taking the dimension-reduced result as an embedding vector of the second attribute value;

performing initialization encoding on entities and attributes in the second type of triples to obtain embedding vectors of the entities and the attributes; and obtaining embedding vectors of the second type of triples based on the embedding vector of the second attribute value and the embedding vectors of the entities and the attributes.

7. The method according to claim 6, wherein the performing dimension reduction on the initialization-encoded result to obtain the dimension-reduced result comprises:

performing dimension reduction on the initialization-encoded result by means of an intermediate layer network structure of an autoencoder to obtain the dimension-reduced result.

8. The method according to claim 1, wherein the training the initial goods knowledge graph based on the graph embedding model to obtain embedding vectors of entities in the trained goods knowledge graph comprises:

performing initialization encoding on the head entities, the relations and the tail entities to obtain the embedding vectors of the first type of triples;

performing embedding representation on the second type of triples to obtain embedding vectors of the second type of triples; and inputting the embedding vectors of the first type of triples and the embedding vectors of the second type of triples into the graph embedding model alternately, and training the initial goods knowledge graph to obtain the embedding vectors of the entities in the trained goods knowledge graph.

9. A device for recommending goods, comprising:

a memory and a processor; wherein the memory is configured for storing a computer program; and the processor is configured for executing the computer program in the memory to implement method according to claim 1.

10. The device according to claim 9, wherein the processor is configured for executing the computer program in the memory to implement following steps:

performing initialization encoding on head entities, relations and tail entities to obtain embedding vectors of the first type of triples; and inputting the embedding vectors of the first type of triples into the graph embedding model, and training the initial goods knowledge graph to obtain the embedding vectors of the entities in the trained goods knowledge graph.

11. The device according to claim 9, wherein the processor is configured for executing the computer program in the memory to implement following steps:

performing embedding representation on the second type of triples to obtain embedding vectors of the second type of triples; and inputting the embedding vectors of the second type of triples into the graph embedding model, and training the initial goods knowledge graph to obtain the embedding vectors of the entities in the trained goods knowledge graph.

* * * * *